(12) United States Patent
Ralli

(10) Patent No.: US 8,809,811 B2
(45) Date of Patent: Aug. 19, 2014

(54) REDUCTION OF INTENSITY RINGING IN FLUORESCENT DISPLAYS

(75) Inventor: Philip J. Ralli, Sudbury, MA (US)

(73) Assignee: Prysm, Inc., San Jose, CA (US)

( * ) Notice: Subject to any disclaimer, the term of this patent is extended or adjusted under 35 U.S.C. 154(b) by 44 days.

(21) Appl. No.: 13/615,449

(22) Filed: Sep. 13, 2012

(65) Prior Publication Data

US 2014/0071684 A1 Mar. 13, 2014

(51) Int. Cl.
*G01J 1/58* (2006.01)
*G09G 3/00* (2006.01)

(52) U.S. Cl.
CPC ..................................... *G09G 3/00* (2013.01)
USPC ..................................................... 250/488.1

(58) Field of Classification Search
CPC ... Y10S 977/932; G01J 3/2823; G02B 5/285; B82Y 20/00; A61B 1/042
USPC ..................................................... 250/488.1
See application file for complete search history.

(56) References Cited

U.S. PATENT DOCUMENTS

| | | | |
|---|---|---|---|
| 3,114,065 A | 12/1963 | Kaphan | |
| 5,080,467 A | 1/1992 | Albert et al. | |
| 5,258,872 A | 11/1993 | Johnson et al. | |
| 5,267,062 A | 11/1993 | Bottorf | |
| 5,343,119 A | 8/1994 | Takuma | |
| 5,513,036 A | 4/1996 | Watanabe et al. | |
| 5,976,424 A | 11/1999 | Merrill et al. | |
| 6,010,751 A | 1/2000 | Cline et al. | |
| 6,172,810 B1 | 1/2001 | Fleming et al. | |
| 6,208,466 B1 | 3/2001 | Liu et al. | |
| 6,531,230 B1 | 3/2003 | Weber et al. | |
| 6,771,419 B1 | 8/2004 | Yamagishi et al. | |
| 6,798,469 B2 | 9/2004 | Kimura | |
| 6,905,220 B2 | 6/2005 | Wortman et al. | |
| 8,000,005 B2 | 8/2011 | Kindler et al. | |
| 2003/0107802 A1 | 6/2003 | Dubin et al. | |
| 2003/0151735 A1* | 8/2003 | Blumenfeld et al. | ........... 356/73 |
| 2005/0280785 A1 | 12/2005 | Beeson et al. | |
| 2008/0291140 A1 | 11/2008 | Kent et al. | |
| 2009/0073434 A1* | 3/2009 | Kim et al. | ..................... 356/317 |
| 2010/0097678 A1 | 4/2010 | Hajjar et al. | |
| 2011/0305000 A1 | 12/2011 | Bukesov et al. | |

OTHER PUBLICATIONS

Jeong et al., "Precise pixel patterning of samll molecule organic light-emitting devices by spin casting," 2011, Organic Electronics, pp. 2095-2102.*

* cited by examiner

*Primary Examiner* — Kiho Kim
(74) *Attorney, Agent, or Firm* — Fish & Richardson P.C.

(57) ABSTRACT

Embodiments of fluorescent display screens having an intermediate layer between a light-emitting fluorescent layer and an excitation filter layer are disclosed. The intermediate layer includes (1) a low-index layer disposed between the light-emitting fluorescent layer and the excitation filter layer and (2) an index bridging layer disposed between the low-index layer and the excitation filter layer. The insertion of the low-index layer and the index bridging layer according to the above configuration reduces the sensitivity of the excitation coupling to the non-uniformities in the excitation filter layer and variability in the output frequency of the excitation source, leading to improved uniformity of display intensity without significant compromise in the excitation coupling efficiency. A index bridging region made of a hard coat also provides abrasion resistance and provides structure rigidity to the adjacent excitation filter layer.

23 Claims, 11 Drawing Sheets

REDUCTION OF INTENSITY RINGING IN FLUORESCENT DISPLAYS

BACKGROUND

This specification relates to display screens and display devices.

Electronic display systems are commonly used to display information from computers and other sources. Scanning beam display systems use screens containing fluorescent materials to emit light under optical excitation to produce images. In some embodiments, the optical excitation is provided by one or more scanning excitation laser beams. The fluorescent materials are arranged into periodic patterns of pixels or sub-pixels in a fluorescent layer of the display. When a particular pixel or sub-pixel of the fluorescent layer is irradiated by the excitation light from an excitation source (e.g., a scanning UV laser), the fluorescent materials in that particular pixel or sub-pixel emits visible light, and forms a corresponding pixel or sub-pixels of an output image. In some embodiments, different colored fluorescent materials are arranged into repeated patterns of parallel stripes in the fluorescent layer of the display. When a scanning laser beam is scanned across each fluorescent stripe, the footprint of the scanning laser beam on the fluorescent stripe defines the boundary of a respective sub-pixel in the output image. In operation, the intensity of the scanning laser beam is time-modulated according to the image information for each sub-pixel. As the scanning laser beams scan across the fluorescent stripes, the composite light emitted by the different colored fluorescent stripes form an image with the appropriate color and intensity in each image pixel.

SUMMARY

This specification describes a technique for reducing non-uniformity in image formation resulted from unintended intensity variability in the excitation light received by a fluorescent layer of a display device. In some embodiments, the technique also produces sturdy and scratch resistant screen layers at a relatively low cost.

In one aspect, in some embodiments (A): a display screen includes a light-emitting layer configured to emit visible light in a first wavelength range under irradiation of excitation light in a second wavelength range distinct from the first wavelength range, the light-emitting layer having a first side facing a viewer side of the display screen, and a second side facing an excitation side of the display screen; an excitation filter layer disposed on the excitation side of display screen relative to the light-emitting layer, and configured to selectively reflect the visible light in the first wavelength range and transmit the excitation light in the second wavelength range; and an intermediate layer disposed between and adjacent to the light-emitting layer and the excitation filter layer, wherein the intermediate layer includes one or more first regions in contact with the light-emitting layer, and a second region separating the one or more first regions from the excitation filter layer, and wherein the second region has a bridging refractive index between a first refractive index of the one or more first regions and a second refractive index of the excitation filter layer.

In some embodiments (B) of the display screen (A), the second region of the intermediate layer is a layer of glass; and the one or more first regions are one or more air gaps created by a plurality of stand-off elements separating the layer of glass from the light-emitting layer.

In some embodiments (C) of the display screen (A), the second region of the intermediate layer is a layer of PET; and the one or more first regions are one or more air gaps created by a plurality of stand-off elements separating the layer of PET from the light-emitting layer.

In some embodiments (D) of any one of the display screens (A-C), the plurality of stand-off elements are a plurality of supporting ridges; and the plurality of supporting ridges create a plurality of air gaps in a low-index layer separating the second region from the light-emitting layer.

In some embodiments (E) of any one of the display screens (A-D), the light-emitting layer comprises a plurality of colored fluorescent stripes, and the plurality of stand-off elements are stripe dividers each separating an adjacent pair of colored fluorescent stripes in the light-emitting layer.

In some embodiments (F) of any one of the display screens (A-C), the plurality of stand-off elements are a plurality of supporting pillars; and the plurality of supporting pillars create an air gap separating the second region from the light-emitting layer.

In some embodiments (G) of any one of the display screens (A-F), the plurality of stand-off elements each extend through the intermediate layer and at least part of the light-emitting layer.

In some embodiments (H) of any one of the display screens (A-F), the plurality of stand-off elements each extend between the light-emitting layer and the excitation filter layer.

In some embodiments (I) of the display screen (A), the intermediate layer comprises a unitary structure having the bridging refractive index, the unitary structure having a flat first surface in contact with the excitation filter layer, and a ridged second surface in contact with the light-emitting layer, wherein one or more recessed areas on the ridged second surface of the unitary structure form the one or more first regions in the intermediate layer.

In some embodiments (J) of any one of the display screens (A-I), the excitation filter layer is a coextruded multi-layer film stack configured to create a transmission resonance for the excitation light in the second wavelength range.

In some embodiments (K) of any one of the display screens (A-J), the excitation filter layer is configured to create a transmission resonance for ultra-violet light of 405-415 nm wavelength.

In some embodiments (L) of any one of the display screens (A-K), the second region in the intermediate layer reduces intensity variations in the excitation light transmitted through the excitation filter layer to the light-emitting layer that have resulted from manufacturing variability in the excitation filter layer.

In some embodiments (M) of any one of the display screens (A-L), the excitation light is ultra-violet light of 405-415 nm wavelength.

In some embodiments (N) of any one of the display screens (A-M), the first refractive index is approximately 1.0, the second refractive index is approximately 1.67, and the bridging refractive index is approximately 1.43.

In some embodiments (0) of any one of the display screens (A-N), the second region in the intermediate layer has a thickness of approximately 5 microns and the bridging refractive index is approximately 1.4-1.5.

In some embodiments (P) of any one of the display screens (A-O), the light-emitting layer is a fluorescent layer having a thickness of approximately ten times a thickness of the second region in the intermediate layer.

In some embodiments (Q) of any one of the display screens (A-P), the one or more first regions in the intermediate layer each have a thickness of approximately 20 microns and the second region in the intermediate layer has a thickness of approximately 5 microns.

In some embodiments (R) of any one of the display screens (A-Q), the display screen further comprises a color filter layer on the viewer side of the display screen relative to the light-emitting layer, and the color filter layer comprises a periodic array of colored filter elements configured to transmit different colored light according to a predetermined sub-pixel pattern.

In some embodiments (S) of any one of the display screens (A-R), the light-emitting layer is a fluorescent layer emitting broad-spectrum visible light under irradiation of the excitation light.

In some embodiments (T) of any one of the display screens (A-S), the light-emitting layer is a fluorescent layer comprising a periodic array of colored fluorescent elements configured to emit different colored light according to a predetermined sub-pixel pattern when irradiated by the excitation light.

In some embodiments (U) of any one of the display screens (A-T), the display screen further includes one or more viewer-side layers disposed on the viewer side of the display screen relative to the light-emitting layer, the one or more viewer-side layers including one or more of: a UV block layer, a contrast enhancement layer, and an outer protective layer.

In some embodiments (V) of any one of the display screens (A-U), the display screen further includes an excitation source; and one or more excitation-side layers disposed on the excitation side the display screen relative to the excitation filter layer, the one or more excitation-side layers including one or more of: a Fresnel layer, a servo layer, a mechanical support layer, and an antireflection coating layer.

In another aspect, a process for making a display screen includes: applying a coating layer to a first side of an excitation filter layer, the excitation filter layer configured to selectively reflect visible light in a first wavelength range and transmit excitation light in a second wavelength range distinct from the first wavelength range, wherein the coating layer has a bridging refractive index smaller than a refractive index of the excitation filter layer; after applying the coating layer, applying an adhesive layer to a second side of the excitation filter layer; after applying the adhesive layer to the excitation filter layer, laminating the excitation filter layer to a substrate by rolling the adhesive layer to the substrate; and after the laminating, disposing a light-emitting layer over the coating layer on the first side of the excitation filter layer, wherein the light-emitting layer is separated from the coating layer by a plurality of air gaps.

Particular implementations of the subject matter described in this specification can be implemented to realize one or more of the following advantages.

A low-index region inserted between a light-emitting layer (including a light-emitting fluorescent layer and an optional thin substrate) and an excitation filter layer of a screen creates enhanced coupling of the excitation light to the fluorescent layer and reduced loss of emitted fluorescent light into the excitation side of the screen. However, the enhanced coupling of excitation light into the fluorescent layer is accompanied by heightened sensitivity to the uniformity of the excitation filter layer and frequency stability of the excitation source. As a result, small non-uniformities in the excitation filter layer and frequency drifts in the excitation light source can result in visible artifacts (e.g., watermarks) and intensity non-uniformity in the output images of the display screen. Insertion of an index bridging region between the low-index region and the excitation filter layer reduces the sensitivity of the excitation coupling to the non-uniformities in the excitation filter layer and variability in the output frequency of the excitation source, leading to improved uniformity of display intensity without significant compromise in the excitation coupling efficiency.

In addition, in some embodiments, an index bridging structure made of a single hard coat layer laminated onto the pre-made excitation light filter provides a simple, effective, and inexpensive solution to the intensity ringing problem. The hard-coated excitation filter layer can be used in an existing display assembly process without requiring significant modifications to existing assembly equipment and display components. Furthermore, various manufacturing techniques can be used to produce the index bridging structure, providing a flexible and economic solution adaptable for many different display manufacturing processes.

In addition, the hard coat layer also protects the excitation light filter from being scratched or damaged during the manufacturing process, and improves the structural strength and integrity of the screen layers.

The index bridging layer in conjunction with the adjacent screen structures increases the delivery of excitation energy from the excitation sources to the light-emitting fluorescent elements of the display, increases the uniformity of the excitation energy delivered to each light-generating fluorescent element, and reduces leakage of visible light from one light-generating fluorescent element into adjacent light-generating fluorescent element. As a result, screen contrast, brightness, and power efficiencies are improved.

The details of one or more implementations of the subject matter described in this specification are set forth in the accompanying drawings and the description below. Other features, aspects, and advantages of the subject matter will become apparent from the description, the drawings, and the claims.

DETAILED DESCRIPTION

This specification describes display systems that use screens containing fluorescent materials to emit visible light under optical excitation to produce images. In this specification, screens that contain phosphor materials under excitation of one or more scanning excitation laser beams are described and used as specific examples of various display systems and devices. Other non-laser excitation light sources, such as mercury lamps, and Light Emitting Diodes (LEDs), can also be used in various display systems and devices in accordance with some embodiments. In addition, optically excitable, light-emitting, non-phosphor fluorescent materials, such as quantum dot materials that emit light under proper optical excitation, can also be used in various display systems and devices in accordance with some embodiments.

Figure 1:
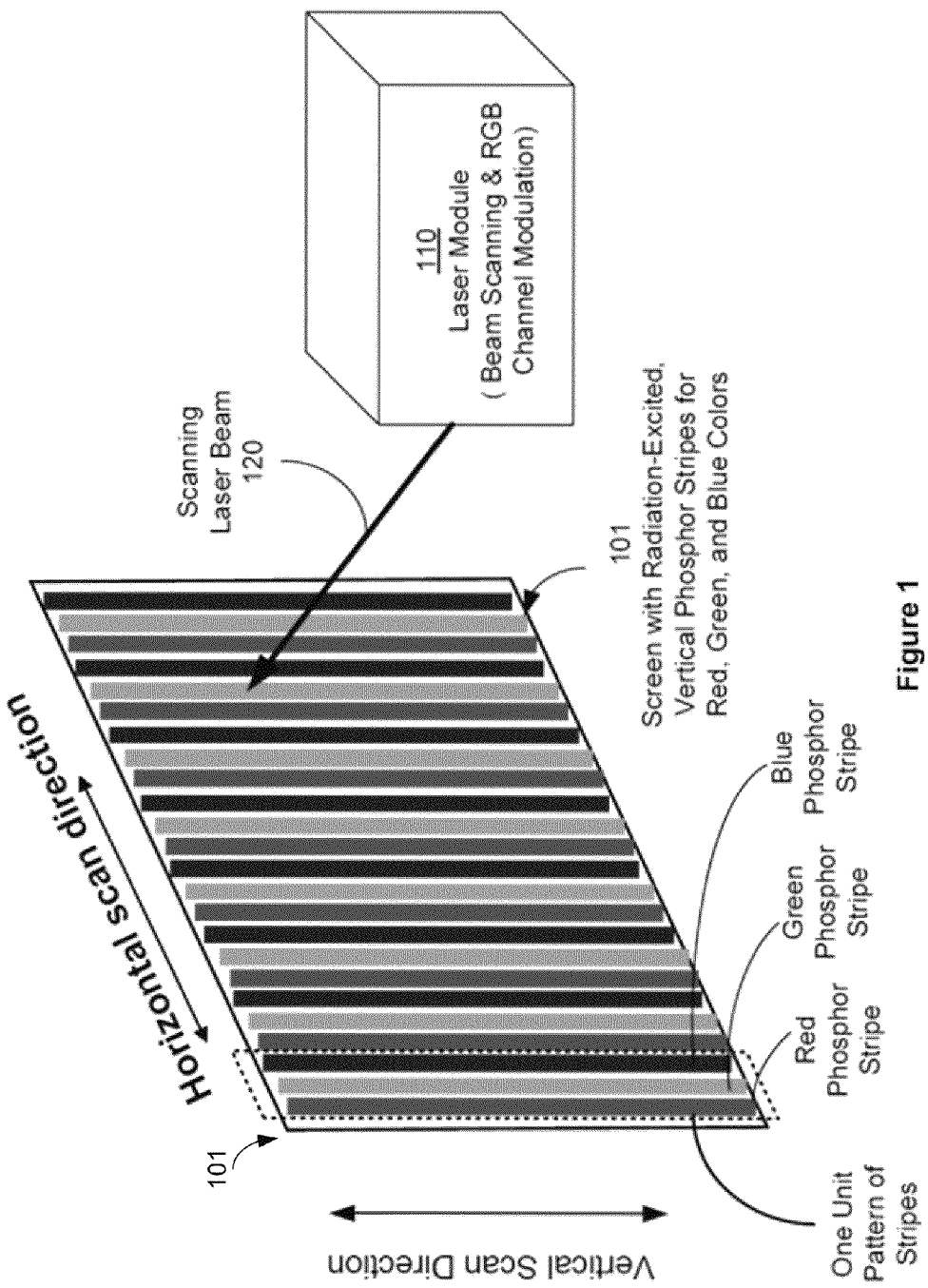
FIG. 1 shows an example scanning laser display system having a fluorescent screen in accordance with some embodiments.

In some embodiments, three different colored phosphors that are optically excitable by a laser beam to respectively produce light in red, green, and blue colors may be formed on a screen as pixel dots or repeated patterns of parallel red, green and blue phosphor stripes to create a fluorescent layer of a display screen. FIG. 1 illustrates an example of a laser-based display system using a screen having color phosphor stripes. The system includes laser module 110 to produce and project at least one scanning laser beam 120 onto screen 101. Screen 101 has repeated patterns of three parallel, different colored phosphor stripes in the vertical direction. The red phosphor stripes absorb the laser light to emit light in red, the green phosphor stripes absorb the laser light to emit light in green, and the blue phosphor stripes absorb the laser light to emit light in blue. One particular spatial color sequence of the stripes is shown in FIG. 1 as red, green and blue. Other color sequences may also be used. In some embodiments, fluorescent stripes of four or more different colors (e.g., red, blue, green, yellow) may be used.

In general, the excitation optical beam is at a frequency or in a spectral range that is within the absorption bandwidths of the fluorescent materials and higher than the frequency or frequencies of the visible light emitted by the fluorescent materials. Accordingly, laser beam 120 is at a wavelength within the optical absorption bandwidth of the color phosphors used in screen 101 and is usually at a wavelength shorter than the wavelengths of the visible blue, green, and red colors for the output images of screen 101. As an example, the color phosphors may be phosphors that absorb UV light in the spectral range from about 380 nm to about 420 nm to produce the desired red, green and blue light. Accordingly, the excitation optical beam may be in the violet spectral range and the ultra violet (UV) spectral range, e.g., wavelengths under 420 nm, or wavelengths in the range of 405 nm-415 nm. In some embodiments, laser beam 120 is generated by a UV laser.

In some embodiments, laser module 110 includes one or more lasers such as UV diode lasers to produce beam 120, a beam scanning mechanism to scan beam 120 horizontally and vertically to render one image frame at a time on screen 101, and a signal modulation mechanism to modulate beam 120 to carry the information for image channels for the red, green and blue colors. In some embodiments, the display system shown in FIG. 1 is configured as a rear projection system where the viewer and laser module 110 are on the opposite sides of screen 101. Alternatively, in some embodiments, the display system is configured as a front projection system where the viewer and laser module 110 are on the same side of screen 101.

Figure 2A:
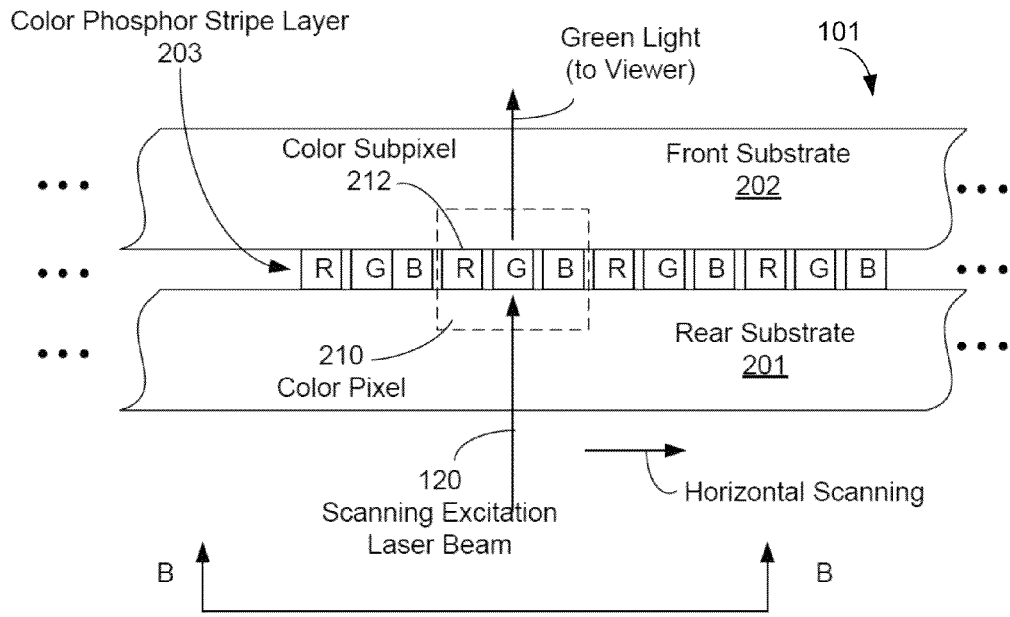
FIGS. 2A and 2B show an example screen structure and the structure of pixels and sub-pixels on the screen in FIG. 1.

FIG. 2A shows a schematic design of screen 101 in FIG. 1 according to some embodiments. FIG. 2A shows a cross-section of screen 101 perpendicular to the vertical scanning directions of the laser beam 120. As shown in this cross-section, screen 101 includes fluorescent layer 203 made of light-emitting, color phosphor stripes. Screen 101 further includes rear substrate 201 on the excitation-side of screen 101 relative to fluorescent layer 203. Rear substrate 201 is substantially transparent to scanning laser beam 120 and faces laser module 110 to receive scanning laser beam 120 and to couple scanning laser beam 120 into fluorescent layer 203. Front substrate 202 is fixed on the viewer side of screen 101 relative to rear substrate 201 in a rear projection configuration. In various embodiments, front substrate 202 includes one or more viewer-side screen layers, and rear substrate 201 includes one or more excitation-side screen layers, respectively.

In FIG. 2A, the color phosphor stripes for emitting visible light of red, green and blue colors are represented by "R", "G" and "B," respectively. Front substrate 202 is substantially transparent to the red, green and blue colored light emitted by the phosphor stripes. Each color pixel 210 includes portions of three adjacent color phosphor stripes in the horizontal direction and its vertical dimension is defined by the beam spread of laser beam 120 in the vertical direction. As such, each color pixel 210 includes three sub-pixels 212 of three different colors (e.g., red, green, and blue). Laser module 110 scans laser beam 120 one horizontal line at a time, e.g., from left to right and from top to bottom to fill screen 101. Laser module 110 is fixed in position relative to screen 101 so that the scanning of beam 120 is controlled in a predetermined manner to ensure proper alignment between laser beam 120 and each pixel position on screen 101.

Figure 2B:
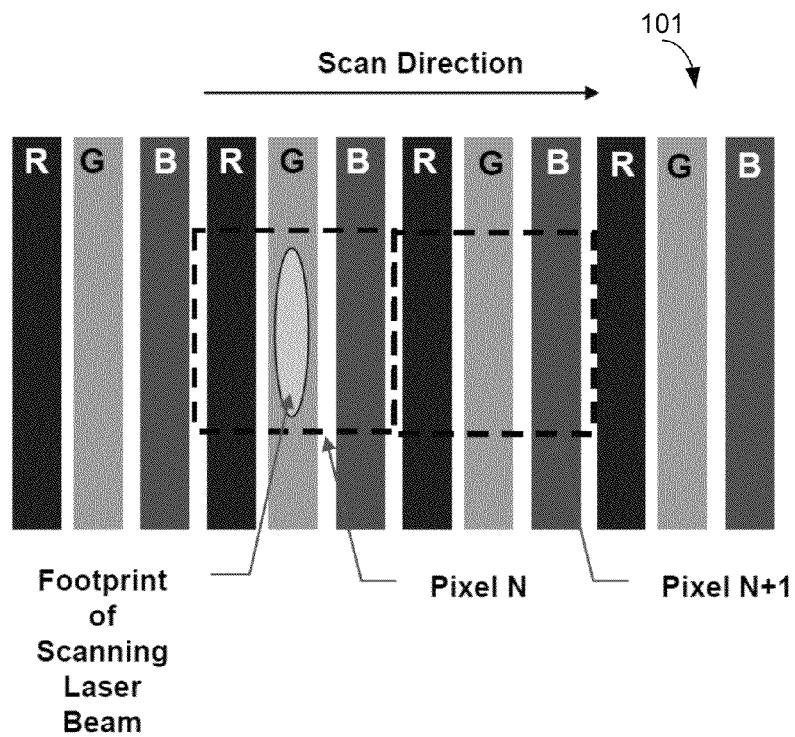

FIG. 2B further shows the operation of screen 101 in a cross-section parallel to the surface of fluorescent layer 203 in accordance with some embodiments. In some embodiments, since each color stripe is longitudinal in shape, the cross section of beam 120 is shaped to be elongated along the direction of the stripe to maximize the fill factor of the beam within each color stripe for a pixel. In some embodiments, this is achieved by using a beam shaping optical element in laser module 110.

In some embodiments, during operation, laser beams 120 are scanned spatially across screen 101 to excite different color pixels at different times. The intensity of each laser beam 120 is modulated according to image information. Each of the modulated beams 120 carries the image signals for the red, green, and blue colors for each pixel at different times and for different pixels at different times. The beams 120 are coded with image information for different pixels at different times by a signal modulation controller. The beam scanning thus maps the time-domain coded image signals in beams 120 onto the spatial pixels on screen 101. For example, in some embodiments, the modulated laser beams 120 have each color pixel time equally divided into three sequential time slots for the three color sub-pixels for the three different color channels. In some embodiments, the modulation of beams 120 use pulse modulation techniques to produce desired grey scales in each color, a proper color combination in each pixel, and desired image brightness.

Figure 3:
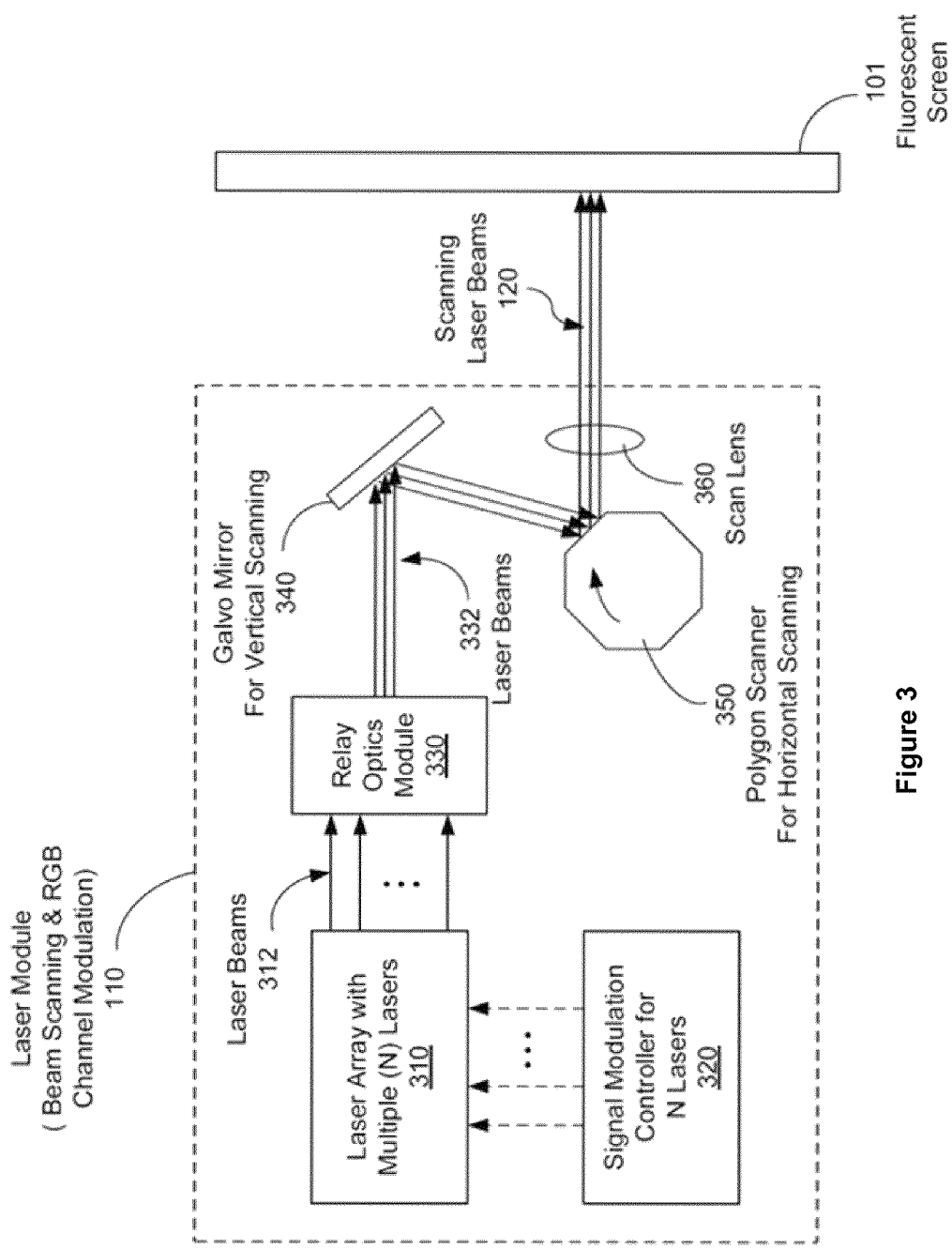
FIG. 3 shows an example laser module of a scanning laser display system in accordance with some embodiments.

FIG. 3 is a schematic diagram of a display system in accordance with some embodiments. The display system includes fluorescent screen 101 and laser module 110. Laser module 110 includes signal modulation controller 320, laser array 310, relay optics module 330, mirror 340, polygon scanner 350, and imaging lens 360.

In some embodiments, laser array 310 includes multiple lasers, e.g., 5, 10, 20, or more, and generates multiple scanning laser beams 312 to simultaneously scan screen 101. In some embodiments, the lasers in laser array 310 are ultraviolet (UV) lasers producing light with a wavelength between about 400 nm and 450 nm (e.g., in the range of 405 nm to 420 nm). In some embodiments, signal modulation controller 320 controls and modulates the lasers in laser array 310 so that scanning laser beams 312 are modulated at the appropriate output intensity to produce a desired image on screen 101. In some embodiments, signal modulation controller 320 includes a digital image processor that generates laser modulation signals. The laser modulation signals include the three different color channels and are applied to modulate the lasers in laser array 310. In some embodiments, the output intensity of laser array 310 is modulated by varying the input current or input power to the laser diodes. In some embodiments, laser array 310 further includes a laser diode for generating a servo beam (not shown), which provides servo feedback control over scanning laser beams 312. In some embodiments, the servo beam is an IR laser beam.

In some embodiments, as shown in FIG. 1, relay optics module 330, mirror 340, polygon scanner 350, and imaging lens 360 together direct scanning laser beams 312 and a servo beam (not shown) to screen 101 and scan said beams horizontally and vertically across screen 101 in a raster-scanning pattern to produce an image. In some embodiments, relay optics module 330 is disposed in the optical path of scanning laser beams 312 and the servo beam and is configured to shape scanning laser beams 312 to a desired spot shape and to direct scanning laser beams 312 into a closely spaced bundle of nearly parallel beams 332. Mirror 340 is a reflecting optic that can be quickly and precisely rotated to a desired orientation, such as a galvanometer mirror, a microelectromechanical system (MEMS) mirror, etc. Mirror 340 directs scanning laser beams 332 and the servo beam from relay optics module 330 to polygon scanner 350, where the orientation of mirror 340 partly determines the vertical positioning of scanning laser beams 332 and the servo beam on screen 101. Polygon scanner 350 is a rotating, multi-faceted optical element having a plurality of reflective surfaces, e.g., 5 to 10 surfaces, and directs scanning laser beams 332 and the servo beam through imaging lens 360 to screen 101. The rotation of polygon scanner 350 sweeps scanning laser beams 332 horizontally across the surface of screen 101 and further defines the vertical positioning of scanning laser beams 332 on screen 101. Imaging lens 360 is designed to direct each of scanning laser beams 332 onto the closely spaced pixel elements on screen 101. In operation, the positioning of mirror 340 and the rotation of polygon scanner 350 horizontally and vertically scan scanning laser beams 332 and the servo beam across screen 101 so that all pixel elements of screen 101 are illuminated as desired.

In some embodiments, a display processor and controller (not shown in FIG. 3) is configured to perform control functions for and otherwise manage operation of laser module 110. Such functions include receiving image data of an image to be generated, providing an image data signal to signal modulation controller 320, providing laser control signals to laser array 310, producing scanning control signals for controlling and synchronizing polygon scanner 350 and mirror 340, and performing calibration functions.

In some embodiments, the display processor and controller (not shown) include one or more suitably configured processors, including a central processing unit (CPU), a graphics processing unit (GPU), a field-programmable gate array (FPGA), an integrated circuit (IC), an application-specific integrated circuit (ASIC), or a system-on-a-chip (SOC), among others, and is configured to execute software applications as required for the proper operation of display system. In some embodiments, the display processor and controller may also include one or more input/output (I/O) devices and any suitably configured memory for storing instructions for controlling normal and calibration operations, according to embodiments of the invention. Suitable memory includes a random access memory (RAM) module, a read-only memory (ROM) module, a hard disk, and/or a flash memory device, among others.

In some embodiments, when laser array 310 includes one or more servo laser beams, screen 101 includes corresponding reflective servo reference marks to reflect the servo beams away from screen 101 as servo feedback light. The display system further includes one or more radiation servo detectors (not shown) to detect the servo feedback light and direct servo detection signals to the display processor and controller for processing. A laser phosphor display (LPD) system configured with a servo beam is described in greater detail in U.S. Patent Application Publication No. 2010/0097678, entitled "Servo Feedback Control Based on Designated Scanning Servo Beam in Scanning Beam Display Systems with Light-Emitting Screens" and filed Dec. 21, 2009, and is incorporated by reference herein.

In a rear projection system shown in FIGS. 1-3, it is desirable that the screen 101 couples as much light as possible from the incident scanning excitation beam(s) into the fluorescent layer, while maximizing the amount of the emitted light from the fluorescent layer that is directed towards the viewer side of the screen 101. Various screen layers and structures can be implemented, either individually or in combination, in the screen 101 to enhance the screen performance, including efficient collection and coupling of the excitation light, maximization of fluorescent light directed towards the viewer side, enhancement of screen contrast, and reduction the screen glare. The structure and materials of screen 101 can be designed and selected to meet constraints on cost and other requirements for specific applications.

Figure 4:
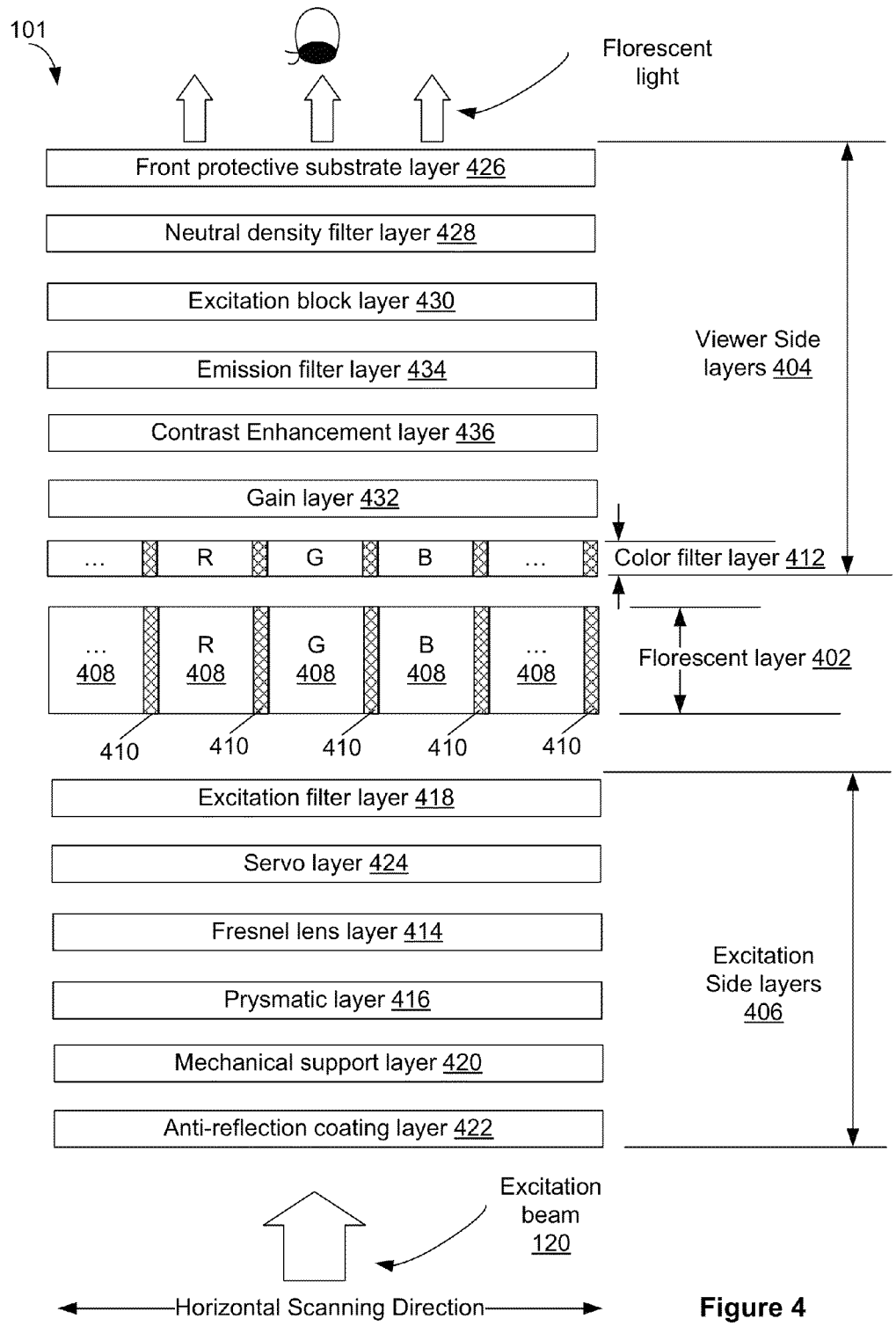
FIG. 4 illustrates various screen layers of a fluorescent screen in accordance with some embodiments.

FIG. 4 illustrates an example configuration of screen 101 in accordance with some embodiments. In some embodiments, as shown FIG. 4, screen 101 includes light-emitting fluorescent layer 402 (e.g., a fluorescent layer including colored fluorescent stripes) for emitting visible light (e.g., light of red, green and blue colors) under optical excitation of the scanning excitation light. Screen 101 also includes a number of viewer-side screen layers 404 and excitation-side screen layers 406 on opposite sides of fluorescent layer 402. The specific screen layers shown in FIG. 4 are illustrative examples and can be selectively implemented in specific screens. A particular fluorescent screen having only some of the layers illustrated in FIG. 4 may be sufficient for a particular display application. Other features and screen layers not shown in FIG. 4 can also be implemented in combination with one or more of the screen layers shown in FIG. 4 in various embodiments.

In some embodiments, as shown in FIG. 4, fluorescent layer 402 includes parallel fluorescent stripes 408 with repetitive color patterns such as red, green and blue phosphor stripes. In some embodiments, fluorescent stripes 408 are elongated in a direction perpendicular to the horizontal scan direction of scanning excitation beam 120 shown in FIG. 1. Stripe dividers 410, which can be optically reflective and opaque, or optically absorbent, are optionally formed between each pair of adjacent fluorescent stripes 408 to minimize or reduce the cross talk between two adjacent sub-pixels. As a result, the smearing at a boundary between two adjacent sub-pixels within one color pixel and between two adjacent color pixels can be reduced, and the resolution and contrast of the screen can be improved. In some embodiments, the sidewalls of each stripe divider 410 are made optically reflective to improve the brightness of each sub-pixel and the efficiency of screen 101.

In some embodiments, fluorescent layer 402 is deposited on a thin substrate (not shown). Alternatively, in some embodiments, fluorescent stripes 408 are formed on the lower (excitation-source-facing) surface of an adjacent viewer-side layer or the upper (viewer-facing) surface of an adjacent excitation-side layer.

In some embodiments, stripe dividers 410 have the same height as the thickness of the fluorescent stripes in the direction perpendicular to screen 101. In some embodiments, stripe dividers 410 have a larger height than the thickness of fluorescent stripes 408 in the direction perpendicular to screen 101, creating an air gap between the layer of fluorescent stripes 408 and the adjacent viewer-side layer. In some embodiments, instead of a layer of colored fluorescent stripes, fluorescent layer 402 includes a uniform layer of broad spectrum fluorescent material (e.g., a uniform mixture of different colored phosphors) that emits white light under irradiation of an excitation optical beam. In some embodiments, the uniform layer of broad spectrum fluorescent material is used to produce a monochromatic display screen, or used in conjunction with a viewer-side color filter layer (e.g., color filter layer 412) to produce a colored display screen.

In FIG. 4, fluorescent layer 402 is the division between the "excitation side" and the "viewer side" of screen 101 where the optical properties of the two sides are designed very differently in order to achieve desired optical effects in each of two sides to enhance screen performance. Examples of such optical effects include, enhancing coupling of the excitation beam into the fluorescent layer, recycling reflected and scattered excitation light that is not absorbed by the fluorescent layer back into the fluorescent layer, maximizing propagation of visible light emitted by the fluorescent layer towards the viewer side of the screen, reducing screen glare to the viewer caused by reflection of ambient light, blocking the excitation light from existing the screen towards the viewer, enhancing the contrast of the screen, and so on.

Referring to FIG. 4, in some embodiments, on the excitation-side of screen 101, excitation-side layers 406 are provided to couple excitation beam 120 into screen 101. In some embodiments, excitation-side layers 406 include Fresnel lens layer 414 which controls the incidence direction of scanning excitation beam 120. In some embodiments, excitation-side layers 406 also include prismatic layer 416 (or a high-index dielectric layer) to recycle light back into screen 101, including the excitation light and the visible light emitted by fluorescent layer 402. In some embodiments, excitation-side layers 406 include mechanical support layer 420 to provide structural support and rigidity for screen 101. Mechanical support layer 420 is substantially transparent to excitation light beam 120. In some embodiments, anti-reflection coating layer 422 is coated on the lower surface of mechanical support layer 420 facing the excitation light source. Anti-reflection coating layer 422 helps to reduce the reflection of the excitation light at the surface of mechanical support layer 420. In some embodiments, excitation-side layers 406 further includes servo layer 424. Servo layer 424 includes a plurality of servo marks that are used to reflect a servo beam and produce servo feedback light for calibrating and controlling the position and timing of the scanning excitation light sources (including excitation light beam 120).

In some embodiments, to improve the brightness of screen 101 to the viewer, screen 101 further includes excitation filter layer 418. Excitation filter layer 418 is placed in the path of excitation beam 120 upstream from fluorescent layer 402 (i.e., on the excitation side of screen 101). Excitation filter layer 418 is configured to transmit light at the wavelength of excitation beam 120 and to reflect visible light emitted by fluorescent layer 402. Excitation filter layer 418 is configured to reduce the optical loss of the visible fluorescent light and thus enhance screen brightness.

In some embodiments, excitation filter layer 418 is a dichroic layer that selectively transmits light at the excitation frequency range, and selectively reflects visible light in the visible frequency ranges. In some embodiments, excitation filter layer 418 is a co-extruded multi-layer film stack that selectively transmits excitation light propagating from the excitation side toward the viewer side, and selectively reflects visible light propagating from the viewer side toward the excitation side of screen 101. In some embodiments, excitation filter layer 418 is a co-extruded multi-layer film stack that selectively transmits excitation light and selectively reflects visible light propagating in both directions. In some embodiments, excitation filter layer 418 is laminated on a planar surface of an adjacent excitation-side layer. More details on the structure of excitation filter layer 418 and its surrounding structures are provided later in the specification with respect to FIGS. 5 and 6A-6I.

On the viewer side of the screen 101, screen 101 includes at least one front protective substrate layer 426 to provide a rigid structural support for various screen components including fluorescent layer 402. In some embodiments, front protective substrate layer 426 is a thin rigid sheet made of a material substantially transparent to the visible colored light emitted by fluorescent layer 402. In some embodiments, front protective substrate layer 426 is made of a plastic material (e.g., Polyethylene terephthalate (PET)), a glass material, or other suitable dielectric material. The thickness of front protective substrate layer 426 is a few millimeters in some embodiments.

In some embodiments, a partially transparent material is used to form front protective substrate 426. The partial transparent material has a uniform attenuation to the visible light including the colored light emitted by the fluorescent stripes to operate like an optical neutral density filter. The uniform attenuation can serve to reduce glare and reflection of the ambient light that enters the display from the viewer side of the display screen. In some embodiments, the uniform attenuation function of front protective substrate layer 426 is provided or enhanced by a separate neutral density filter layer (e.g., neutral density filter layer 428).

In some embodiments, front protective substrate layer 426 is made reflective and opaque to the excitation light of excitation beam 120 to block the excitation light from reaching the viewer and to recycle the unabsorbed excitation light back to fluorescent layer 402. In some embodiments, the excitation blocking function of the front protective substrate layer 426 is provided or enhanced by a separate excitation block layer (e.g., excitation block layer 430). In some embodiments, excitation block layer 430 is made of a material that selectively transmits visible light and absorbs or reflects the excitation light. For example, in some embodiments, a polyester-based filter is used as excitation block layer 430 to block the excitation light in the wavelength range of 400-415 nm. In some implementations, excitation block layer 430 has less than 0.01% transmission below 410 nm, while having greater than 50% transmission above 430 nm. In some embodiments, the neutral density filtering function is incorporated in excitation block layer 430. For example, in some embodiments, excitation block layer 430 provides a uniform attenuation to the visible light between 430 nm and 670 nm.

In some embodiments, viewer-side layers 404 further include emission light filter 434 as a conjugate component to excitation filter layer 418. In some embodiments, the emission light filter 434 is a dichroic layer configured to selectively transmit the visible light emitted by fluorescent layer 402 and to reflect light at the wavelength or in the wavelength range of excitation beam 120. In some embodiments, the emission light filter 434 is a co-extruded multi-layer film stack that is configured to selectively transmit visible light emitted by fluorescent layer 402 and selectively reflect unabsorbed excitation light that passed through fluorescent layer 402. Hence, the emission filter layer 434 can recycle the excitation light that passes through the fluorescent layer 402 back to fluorescent layer 402 and increase the utilization efficiency of the excitation light and the screen brightness.

In some embodiments, viewer-side layers 404 includes screen gain layer 432 that optically enhances the brightness and viewing angle of screen 101. In some embodiments, gain layer 432 includes a lenticular layer with lens elements, a diffractive optic layer of diffractive elements, a holographic layer with holographic elements, or a combination of these and other structures.

In some embodiments, viewer-side layers 404 include contrast enhancement layer 436. In some embodiments, contrast enhancement layer 436 includes color-selective absorbing stripes that spatially correspond to and align with colored fluorescent stripes in fluorescent layer 402 along the direction perpendicular to the screen layers. The color-selective absorbing stripes therefore transmit light in respective colors and absorb light in other colors, and enhancing the color boundaries of the colored sub-pixels in screen 101.

In some embodiments, the contrast enhancement function of contrast enhancement layer 436 is provided or enhanced by a neutral density filter (e.g., neutral density filter 428 or an additional neutral density filter) that uniformly attenuates visible light of different frequencies. The neutral density filter reduces reflection of ambient light that enters the display, and prevent color washout by the ambient light.

In some embodiments, the contrast enhancement function of contrast enhancement layer 436 is provided or enhanced by color filter layer 412 placed adjacent to fluorescent layer 402. Color filter layer 412 includes different colored filter stripes that each selectively transmit light of a respective color, and absorbs light of other colors. The colored filter stripes spatially correspond to and align with fluorescent stripes of corresponding colors in fluorescent layer 402. In some embodiments, the color filter stripes are thin film stripes laminated on a lower (excitation-source-facing) surface of a transparent substrate. In some embodiments, each pair of adjacent colored filter stripes are separated by a respective stripe divider. In some embodiments, colored fluorescent stripes 408 in fluorescent layer 402 and the colored filter stripes in color filter layer 412 share the same set of stripe dividers that extend through both fluorescent layer 402 and color filter layer 412. In some embodiments, fluorescent layer 402 includes a uniform mixture of different colored phosphors and emits broad-spectrum white light, and the colored filter stripes in color filter layer 412 are used to define boundaries of colored image pixels.

The screen layers shown in FIG. 4 are merely illustrative of the type of functions that can be implemented in a fluorescent screen. Various functions may be combined and provided by a single screen layer or a composite of multiple screen layers. The spatial sequence of the screen layers in FIG. 4 is merely illustrative. For example, the spatial sequence of the layers 428, 430, 434, and 432 on the viewer side of fluorescent layer 402 may be different from what is shown in FIG. 4. Similarly, the spatial sequence of the layers 414, 416, 424 on the excitation side of fluorescent layer 402 may be different from what is shown in FIG. 4. In addition, screen 101 may include additional layers, such as substrate layers, support layers, adhesive layers, that connect and/or support other layers. In some embodiments, there may be additional structural elements, such as gaps, pillars, and supporting ridges, glue lines, and so on, inserted between one or more screen layers. In some embodiments, various structures (e.g., stripe dividers, stand-off elements, pillars, and ridges) may penetrate multiple layers of screen 101. More details and variations of screen 101 are provided later in the specification with respect to FIGS. 5 and 6A-6I.

As illustrated in FIG. 4, in some embodiments, an excitation filter layer (e.g., excitation layer filter 418) is placed between the excitation light source and the light-emitting fluorescent layer of the display screen. The excitation filter layer selectively transmits excitation light in a first wavelength range (e.g., the UV range), and reflects visible light in a second wavelength range (e.g., the visible range). Specifically, when the excitation filter layer is placed next to the fluorescent layer on the excitation side of the screen, the excitation filter layer selectively transmits excitation light propagating from the excitation side toward the fluorescent layer, and selectively reflects visible light propagating from the fluorescent layer toward the excitation side. Hence, the excitation filter layer helps to increase the amount of visible light that is directed to the viewer side of the display screen, and improve image brightness of the display.

Although placing the excitation filter layer next to the fluorescent layer reduces the amount of visible light that escapes to the excitation side of the display screen, the presence of the fluorescent layer immediately adjacent to the excitation filter layer sometimes causes reflection of the excitation light at the interface between the fluorescent layer and the excitation filter layer. For this reason, some excitation light is not utilized by the fluorescent layer to produce visible light, and the efficiency of the screen is reduced. To address this problem, in some embodiments, a narrow low index region (e.g., an air gap) is inserted between the fluorescent layer and the excitation filter layer, so that more excitation light can be coupled into the fluorescent layer, and the reflection of the excitation light back to the excitation source(s) is reduced. The increased coupling of excitation light into the fluorescent layer increases the overall image brightness of the display screen. In addition, the low index region also cause more visible light emitted by the fluorescent stripes to be reflected back toward the viewer side at the interface between the fluorescent layer and the low index region. The low index region inserted between the fluorescent layer and the excitation filter layer has a refractive index smaller than both the refractive index of the fluorescent layer and the refractive index of the excitation filter layer. Example screens including a low index region between the fluorescent layer and the excitation filter layer for improved screen brightness are described in U.S. Pub. No. 2011/0305000 A1, which is incorporated herein by reference.

Although a low index region inserted between the excitation filter layer and the fluorescent layer helps to couple more excitation light into the fluorescent layer, and improves the efficiency of the display screen, the presence of the low index region also increases the requirement on the optical uniformity of the excitation filter layer. Without subscribing to any particular theory, the excitation filter layer is typically a multi-layer structure (e.g., a coextruded multi-layer film stack) that creates a resonance condition for the excitation light beam, such that it has a transmission peak at the excitation light wavelength, and significantly less or no transmission away from the excitation light wavelength. The heightened frequency-selectivity of the excitation filter layer means that a small variability (e.g., manufacturing variability) in the thickness or optical properties of the excitation filter layer would cause significant enough change in the transmittance of the excitation light through the excitation filter layer to cause visible non-uniformities (e.g., "watermarks" or "intensity ringing") in the output images, even if the excitation beam intensity is not varied at the excitation laser source. In addition, a small wavelength variation (e.g., frequency drifts) in the excitation light source during the scanning across the screen would also cause significant enough change in the transmittance of the excitation light through the excitation filter layer to cause visible non-uniformity in the output image, even if the excitation beam intensity is not varied at the excitation laser source.

Figure 5:
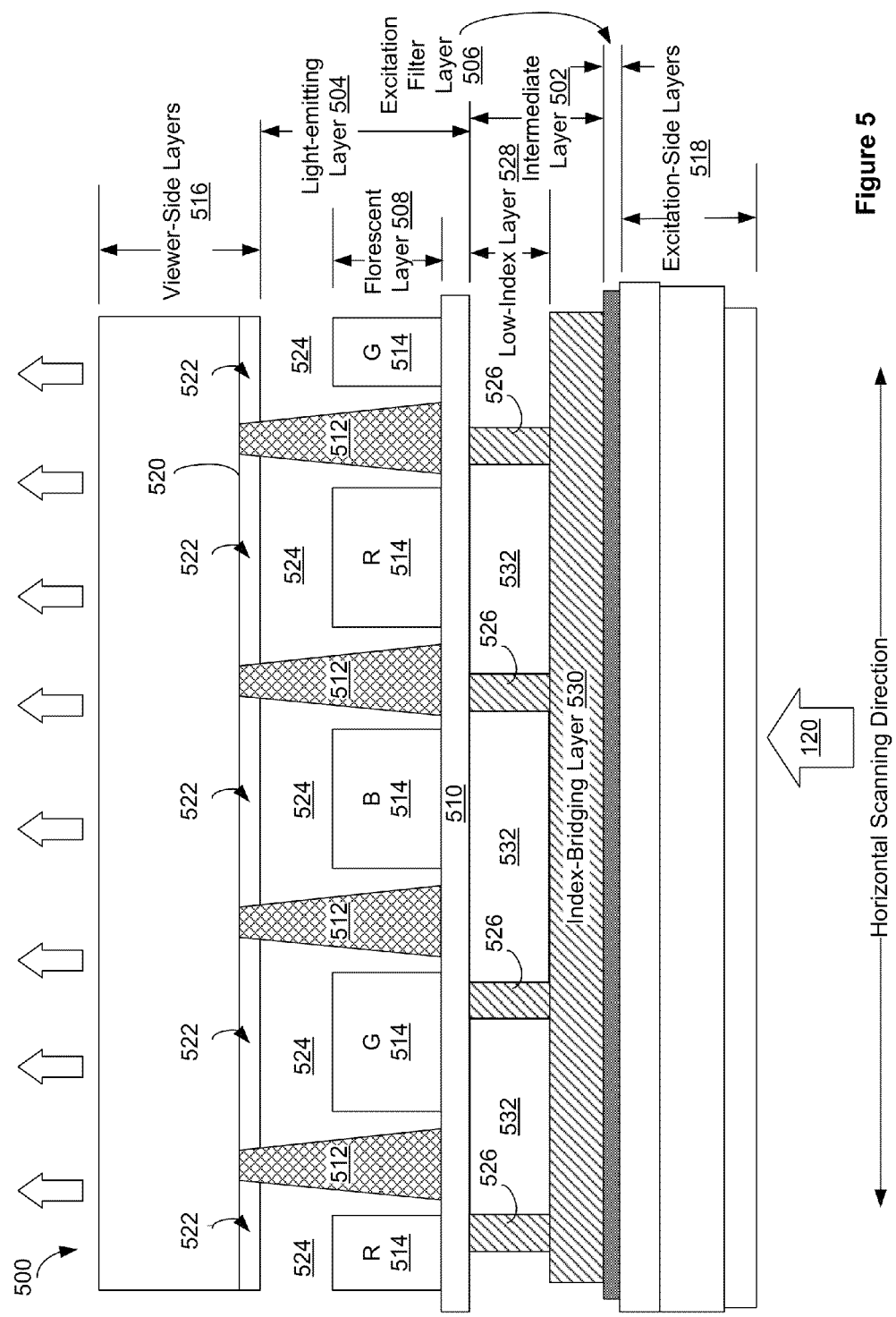
FIG. 5 illustrates structures of a fluorescent screen having a low-index region and an index bridging region in an intermediate layer between a light emitting layer and an excitation filter layer in accordance with some embodiments.

According to embodiments described in this specification, the unintended variations in excitation light intensity received by the fluorescent layer can be reduced when an index bridging structure is inserted between the low-index region and the excitation filter layer of the screen. The index bridging structure has an index of refraction that is between the respective indices of refraction of the excitation filter layer and the low index region. The index of refraction of the index bridging structure is chosen such that it does not significantly decrease the total transmission of the excitation light into the fluorescent layer. At the same time, the index bridging structure reduces the sensitivity of the excitation transmittance to the physical and optical non-uniformities in the excitation filter layer and the instability in the excitation light source(s). FIG. 5 illustrates an example screen 500 that includes an index bridging structure between the low index region and the excitation filter layer of the screen. FIGS. 6A-6I illustrate additional example variations that can be made to the example screen 600 shown in FIG. 6.

FIG. 5 is a partial cross-sectional view of screen 500 in a plane perpendicular to the screen layers and the vertical scanning direction of the excitation beam(s) 120. Screen 500 includes one or more viewer-side layers 516, light-emitting layer 504, intermediate layer 502, excitation filter layer 506, and one or more excitation-side layers 518. Light-emitting layer 504 includes fluorescent layer 508, and optionally, a substrate layer 510 and a low-index gap 524. Intermediate layer 502 includes low-index layer 528 and index-bridging layer 530. Intermediate layer 502 is disposed between and immediately adjacent to light-emitting layer 504 and excitation filter layer 506. Excitation light beam 120 reaches the different screen layers in a sequence of: excitation-side layers 518, excitation filter layer 506, intermediate layer 502 (index-bridging layer 530 and low-index layer 528), light-emitting layer 504 (substrate layer 510, fluorescent layer 508, and gap layer 524), and viewer-side layers 516 (color filter layer 520 and other viewer-side layers).

In some embodiments, as shown in FIG. 5, light-emitting layer 504 includes both fluorescent layer 508 and substrate layer 510, where substrate layer 510 is placed immediately adjacent low-index layer 528 and supports fluorescent layer 508 on the excitation side. In some embodiments, the surface of fluorescent layer 508 that faces the excitation side can be laminated on substrate layer 510 using an adhesive layer, or through Wan der Waals force. In some embodiments (not shown in FIG. 5), light-emitting layer 504 does not include substrate 510 or gaps 524, and fluorescent layer 508 is laminated on the lower surface of an adjacent viewer-side layer (e.g., color filter layer 520).

In some embodiments, fluorescent layer 508 includes a plurality of parallel fluorescent stripes 514. In some embodiments, each of fluorescent stripes 514 in fluorescent layer 508 is spaced at a pitch of 400 microns to 550 microns (e.g., 450 microns or 500 microns), so that pixel width of a pixel element on screen 500 is on the order of about 1350-1500 microns. In other embodiments, each of fluorescent stripes 514 is spaced at a pitch of about 180 microns to 220 microns, so that pixel width of a pixel element on screen 500 is on the order of about 600 microns. In yet other embodiments, the pixel elements of screen 500 include separate phosphor regions rather than portions of phosphor stripes. In some examples, each sub-pixel is a discrete and isolated phosphor dot or rectangle of one particular light-emitting phosphor material. In some embodiments, fluorescent layer 508 has a thickness of approximately 50 microns. In some embodiments, fluorescent stripes 514 each have a length of approximately 60 inches. In some embodiments, fluorescent stripes 514 each have a width of approximately 450 microns.

In some embodiments, optional thin substrate 510 is a semi-rigid material that is transparent to UV and visible light and has an index of refraction that is relatively close to that of fluorescent materials in fluorescent layer 508. Because the index of refraction of transparent substrate 510 is selected to be approximately equal to the index of refraction of fluorescent layer 508, transparent substrate 510 and fluorescent layer 508 are optically coupled with little reflection occurring at the interface between transparent substrate 510 and fluorescent stripes 514. Other characteristics for transparent substrate 510 include a low coefficient of thermal expansion and low moisture absorption, and being readily manufacturable in thin layers. In addition, transparent substrate 510 is preferably comprised of a material that is not brittle and does not break-down with exposure to UV light and discolor over the lifetime of display system 500. In some embodiments, transparent substrate 510 is a polyethylene terephthalate (PET) film. In general, transparent substrate 510 is configured as thin as practicable to improve screen brightness and color gamut, and to minimize light loss due to light piping to the edges of the transparent substrate 510. In some embodiments, transparent substrate 510 is a PET film that is six microns or less in thickness. In some embodiments, the thickness of transparent substrate 510 is selected to be less than about one-third of the thickness of fluorescent stripes 514. In some embodiments, the thickness of transparent substrate 510 is selected to be about 15-20 microns, where the thickness of fluorescent layer 508 is about 50 microns.

In some embodiments, light-emitting layer 504 further includes a plurality of stripe dividers 512 each separating a respective pair of adjacent fluorescent stripes 514 of fluorescent layer 508. In some embodiments (not shown in FIG. 5), stripe dividers 512 are of the same height as the thickness of fluorescent layer 508 (i.e., the thickness of fluorescent stripes 514) in the direction perpendicular to the screen layers. In other words, stripe dividers 512 do not lift the adjacent viewer-side layers away from fluorescent layer 508 to create air gaps, and the tops of stripe dividers 512 are flush with the tops of fluorescent stripes 514.

In some embodiments, as shown in FIG. 5, stripe dividers 512 have a height greater than the thickness of fluorescent layer 508 in the direction perpendicular to the screen layers, and hence, lift viewer-side layers 516 away from fluorescent layer 508 to create a plurality of gaps 524 between fluorescent layer 508 and the immediately adjacent viewer-side layer of light-emitting layer 504. The use of a material having a low-index of refraction (e.g., air) that is disposed in gaps 524 reduces the reflection of the visible light emitted by fluorescent layer 508 back toward the excitation side. In some embodiments, gaps 524 are relatively small compared to the dimensions of fluorescent stripe 514 and stripe divider 512.

In some embodiments, stripe dividers 512 have sidewalls that are normal to substrate 510 and/or the adjacent viewer-side layer (e.g., color filter layer 520). In some embodiments, stripe dividers 522 have walls that are angled, i.e., not normal to substrate 510 or the adjacent viewer-side layer. In some embodiments (not shown), stripe dividers 512 have vertical walls, and each stripe divider 512 is in contact with its adjacent fluorescent stripes 514 from top to bottom. In some embodiments, stripe dividers 512 have vertical or angled walls, and the walls are not in contact with the adjacent fluorescent stripes 514 (e.g., as shown in FIG. 5). In some embodiments, stripe dividers 512 are made of material that absorbs visible light emitted by the adjacent phosphor stripes 514. In some embodiments, stripe dividers 512 are made of a material that reflects visible light emitted by the adjacent phosphor stripes 514. In some embodiments, stripe dividers 512 are linear ridges that run along the elongated fluorescent stripes 514. In some embodiments, fluorescent layer 508 includes isolated fluorescent sub-pixel elements, and stripe dividers 512 are dividers that enclose discrete and isolated sub-pixel elements.

In some embodiments, viewer-side layers 516 include color filter layer 520 immediately adjacent to light-emitting layer 504. In some embodiments, color filter layer 520 includes stripes of color filter elements 522 each transmitting light of one particular color. Each color filter element 522 is aligned with a corresponding fluorescent stripe 514 of the same color. In some embodiments, color filter layer 520 is a structurally rigid or semi-rigid plate. In other embodiments, color filter layer 520 is a relatively flexible substrate or sheet that is held in place by other structural elements (e.g., an adjacent viewer-side layer) of screen 500. In some embodiments, color filter layer 520 also includes stripe divider elements that correspond to stripe dividers 512 in terms of positions and colors. In some embodiments, as shown in FIG. 5, stripe dividers 512 used to separate fluorescent stripes 514 in fluorescent layer 508 extend into color filter layer 520, and are used to separate adjacent color filter elements 522 in color filter layer 520 as well.

In screen 500, excitation filter layer 506 is dichroic filter layer that is configured to selectively reflect visible light in the visible wavelength range and transmit excitation light in the excitation wavelength range distinct from the visible wavelength range. In some embodiments, excitation filter layer 506 is a multi-layer optical film that transmits UV light traveling in both directions, and reflects visible light in both directions. Thus, when a UV excitation light source is used to generate excitation beam(s) 120, excitation filter layer 502 allows UV light contained in scanning excitation beam 120 to enter fluorescent layer 508 of screen 500, while reflecting visible light emitted by fluorescent layer 508 and unabsorbed UV light that is still scattering inside screen 500 back toward the viewer side. In some embodiments, when the excitation source is ultra-violet light of 405-415 nm wavelengths, the excitation filter layer is a coextruded multi-layer film stack configured to create a transmission resonance for ultra-violet light of 405-415 nm wavelengths.

In some embodiments, excitation filter layer 506 is a dichroic layer made of a very thin, co-extruded multi-layer film stack. More specifically, multiple sheets of films with different refractive indices are laminated or fused together to construct a composite sheet as the dichroic layer. In some embodiments, multiple layers of two different materials with different indices may be used to form a composite film stack by placing the two materials in an alternating manner. In some embodiments, three or more different materials with different indices may be stacked together to form the composite film stack. Such a composite sheet for a dichroic layer is essentially an optical interference reflector that transmits the excitation light (e.g., UV light) that excites the phosphor materials which emit colored visible light and reflects the colored visible light. Such composite sheets may be formed of organic, inorganic or a combination of organic and inorganic materials. The multiple-layer composite sheet may be rigid or flexible. A flexible multi-layer composite sheet may be formed from polymeric, nonpolymeric materials, or polymeric and non-polymeric materials.

Exemplary dichroic films including a polymeric and non-polymeric material are disclosed in U.S. Pat. Nos. 6,010,751 and 6,172,810 which are incorporated by reference in their entirety as part of the specification of this application. An all-polymer construction for such composite sheets may offer manufacturing and cost benefits. If high temperature polymers with high optical transmission and large index differentials are utilized in the of an interference filter, then an environmentally stable filter that is both thin and very flexible can be manufactured to meet the optical needs of short-pass (SP) and (LP) filters. In particular, coextruded multilayer interference filters as taught in U.S. Pat. No. 6,531,230 can provide precise wavelength selection as well as large area in a very thin cost effective manufacturing composite layer set. The entire disclosure of U.S. Pat. No. 6,531,230 is incorporated by reference as part of the specification of this application. The use of polymer pairs having high index differentials allows the construction of very thin, highly reflective mirrors that are freestanding, i.e. have no substrate but are still easily processed for constructing large screens. Such a composite sheet is functionally a piece of multi-layer optical film (MOF) and includes, e.g., alternating layers of PET and co-PMMA to exhibit a normal-incidence reflection band suitable for the screen applications of this application. As an example, an enhanced specular reflector (ESR) made out of a multilayer polyester-based film from 3M Corporation may be configured to produce the desired dichroic reflection and transmission bands for the present application. Examples for various features of multi-layer films are described in U.S. Pat. No. 5,976,424, U.S. Pat. No. 5,080,467 and U.S. Pat. No. 6,905,220, all of which are incorporated by reference as part of the specification of this application.

As shown in FIG. 6, instead of a "single-ply" low-index layer, the region between light-emitting layer 504 and excitation filter layer 506 is occupied by a composite (or "double-ply") low-index layer, referred to intermediate layer 502. Intermediate layer 502 includes one or more first (upper) portions 532 (i.e., one or more regions in low-index layer 528) in contact with light-emitting layer 504, and a second (lower) portion (i.e., index-bridging layer 530) separating the one or more first portions 532 from excitation filter layer 506. The second (lower) portion has a bridging refractive index between the refractive index of first portions 532 and the refractive index of excitation filter layer 506. In some embodiments, the second region 530 in intermediate layer 502 has a thickness of approximately 5 microns.

In some embodiments, low-index layer 528 in intermediate layer 502 is an air-filled gap. Alternatively, low-index layer 528 is filled with a solid or semi-solid material (e.g., a gel layer, an aerosol layer, or a polymer layer) having an appropriately low index of refraction with respect to substrate 510 and excitation filter layer 506. In some embodiments, second region (index bridging layer 530) has a bridging refractive index of approximately 1.4-1.5. In some embodiments, the refractive index of first portions 532 in low-index layer 528 is approximately 1.0, the refractive index of excitation filter layer 506 is approximately 1.67, and the bridging refractive index (i.e., the refractive index of the second portion 530) is approximately 1.43. In more general terms, the refractive index of the index-bridging region is between (e.g., half-way between) the refractive index of the low-index region and the refractive index of the excitation filter layer, and the refractive index of the low index region is between (e.g., half-way between) the refractive index of the light-emitting layer and the refractive index of the index-bridging region. The refractive index of the light-emitting layer is the refractive index of the layer that is immediately adjacent to the low-index region in the intermediate layer.

Because the material that is filling low index layer 528 has a lower index of refraction than index bridging layer 530, a good portion of the light (including visible light emitted by fluorescent stripes 514 and unabsorbed excitation light reflected by viewer side layers 516) travelling towards the excitation side of screen 500 will be reflected by index bridging layer 530 back toward the viewer side. In addition, excitation filter layer 506 is configured to selectively block substantially all visible light from being transmitted through excitation filter layer 506 from the viewer side toward the excitation side. Therefore, transmission of the emitted visible light toward the viewer side is maximized. Furthermore, index bridging layer 530 has an index of refraction below the index of refraction of excitation filter layer 530, and low-index layer 532 has an index of refraction below the index of refraction of index-bridging layer 530. Therefore, the index change at the interface between index bridging layer 530 and excitation filter layer 506 is not as abrupt in screen 500 as in another screen where the low-index region (i.e., a single-ply low-index layer) is located immediately adjacent to excitation filter layer 506. This reduced index change reduces the sensitivity of the excitation transmittance to the physical and optical non-uniformities in excitation filter layer 506 and the instability in the excitation light source(s). As a result, unintended non-uniformities in the brightness of the output images are reduced without significant compromise to overall screen brightness.

In some embodiments, low-index layer 528 includes a plurality of stand-off elements 526 in addition to low-index portions 532. Stand-off elements 526 are spacing members configured to define and maintain the uniformity and thickness of low-index layer 528. In some embodiments, the height of low-index layer 528 is defined by one or more stand-off elements 526 positioned entirely between excitation filter layer 506 and light-emitting layer 504. The height of stand-off elements 526 may be as great as the thickness of fluorescent layer 508 or as small as one wavelength of the emitted visible light. In some embodiments, in order to minimize horizontal travel of the emitted light, the height of intermediate layer 502 is made as small as practicable, such that very little emitted light would travel to unwanted regions of screen 500, such as into stripe dividers 512. In some embodiments, stand-off elements 526 extend through low-index layer 528 and have respective end portions embedded in light-emitting layer 508.

In some embodiments, stand-off elements 526 are made of a material that is transparent to visible and UV light and remain dimensionally stable under the pressures found in screen 500. Other desirable characteristics of stand-off elements 526 include low moisture absorption and resistance to optical and mechanical break-down under prolonged exposure to UV light. In some embodiments, stand-off elements 526 are made of resin or adhesive (e.g., PSA).

In some embodiments, stand-off elements 526 are positioned randomly with respect to fluorescent stripes 514 to prevent patterning effects and other visible artifacts (e.g., Moiré patterns) from being visible to viewer. In some embodiments, stand-off elements 526 are positioned in specific regions of low-index layer 528 in which the presence of such structural elements is less likely to be detected by the viewer. For example, in some embodiments, stand-off elements 526 are positioned only adjacent to blue phosphor regions, since green light is aligned with human eye photoptic peak and variation in green light caused by stand-off elements 526 are more easily detected. In some embodiments, stand-off elements 526 are positioned adjacent stripe dividers 512, since stripe dividers 512 are regions in which little light is emitted anyway.

In some embodiments, stand-off elements 526 are configured as structural members of screen 401 in order to enhance cohesion of the various layers making up screen 401. For example, glue lines that mechanically couple excitation filter layer 506 to light-emitting layer 504 (e.g., to the transparent substrate 510) can serve as stand-off elements 526 in some embodiments. In some embodiments, stand-off elements 526 are in the shape of straight or curve elongated stripes dividing low-index layer 528 into multiple isolated low-index regions (e.g., multiple first regions 532). In some embodiments, stand-off elements 526 are in the shape of individual stand-off pillars. In some embodiments, low-index layer 506 is a single continuous low-index region (e.g., a single first region 532) in which the stand-off elements 526 (e.g., stand-off pillars) are distributed.

In some embodiments, index bridging layer 530 is a layer made separately from stand-off elements 526. In some embodiments, the index bridging layer 530 is a layer of adhesive (e.g., pressure sensitive adhesive). In some embodiments, index bridging layer 530 is a layer of glass with a layer of adhesive (e.g., pressure sensitive adhesive) applied thereon. In some embodiments, index bridging layer 530 is a layer of pressure sensitive adhesive applied on the viewer-facing surface of excitation filter layer 506 layers. In some embodiments, index bridging layer 530 is a layer of PET. In some embodiments, index bridging layer 530 is a layer of cured coating layer (e.g., a "hard coat", which could be abrasion-resistant) deposited on the viewer-facing surface of excitation filter layer 506. In some embodiments, index-bridging layer 530 is a layer laminated on excitation filter layer 506 using a thin adhesive layer. In some embodiments, the index bridging layer 530 made with an abrasion-resistant material provides the additional benefit of protecting the underlying excitation filter layer from being scratched during screen assembly. In some embodiments, the index bridging layer 530, such as an index bridging layer made of a solid layer or "hard coat", also provides or enhances structure rigidity of the adjacent screen layers (e.g., excitation filter layer 506) and keeps them from warping or breakage. In some embodiments, by keeping excitation filter layer 506 from warping or breakage, index bridging layer 530 also helps to maintain the optical uniformity of excitation filter layer 506. In some embodiments, the multiple first regions 532 is a plurality of air gaps created by a plurality of supporting ridges (e.g., stand-off elements 526) separating the solid index bridging layer 530 from light-emitting layer 504. In some embodiments, the multiple first regions 532 can be filled by a low-index material other than air. For example, a low-index gel or aerosol can be used to fill first regions 532.

In some embodiments, index bridging layer 530 and stand-off elements 526 are parts of a unitary structure, such as a unitary structure made from a resin using a mold, and the unitary structure has the bridging index. The unitary structure has a flat first surface in contact with the upper surface of excitation filter layer 506, and a ridged second surface in contact with light-emitting layer 504, wherein recessed areas on the ridged second surface of the unitary structure form the plurality of first regions 532 in intermediate layer 502.

In some embodiments, light-emitting layer 504 is a fluorescent layer 508 having a thickness of approximately ten times a thickness of index bridging layer 530. For example, in some embodiments, fluorescent layer 508 is about 50 microns thick, and index bridging layer 530 is about 5 microns thick.

In some embodiments, the plurality of first regions 532 in low index layer 528 each have a thickness of approximately 20 microns and the second region 530 has a thickness of approximately 5 microns.

In some embodiments, instead of fluorescent layer 508 having colored fluorescent stripes 514, light-emitting layer 504 is a fluorescent layer that emits broad-spectrum visible light under irradiation of the excitation light. In such embodiments, display screen 500 includes a color filter layer (e.g., color filter layer 520) on the viewer side of the fluorescent layer, where the color filter layer includes a periodic array of colored filter elements 522 configured to transmit different colored light according to a predetermined sub-pixel pattern. In these embodiments, the fluorescent layer emits white light, and the color filter layer is used to define the boundaries of the colored pixels.

FIG. 5 illustrates an example screen 500 according to some embodiments. FIGS. 6A-6I each illustrate respective screens 600 that include one or more variations to one or more components of screen 500 according to various embodiments.

Figure 6A:
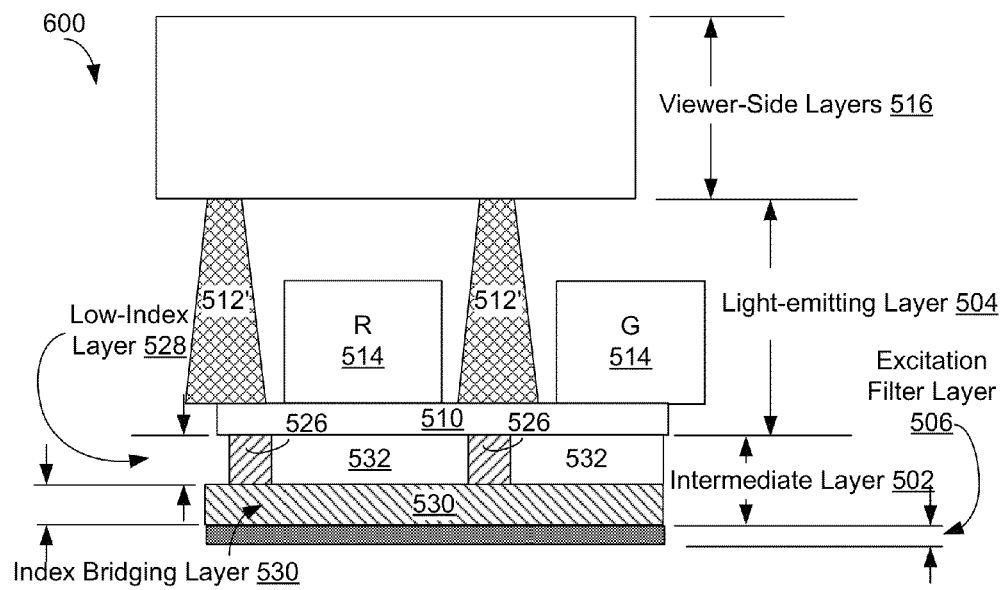
FIGS. 6A-6I illustrate variations to the screen structure shown in FIG. 5 in accordance with some embodiments.

For example, in some embodiments, as shown in FIG. 6A, the stripe dividers (e.g., stripe dividers 512') that separate fluorescent stripes 514 in the fluorescent layer do not extend into viewer-side layers 516, and instead, extend entirely between viewer-side layers 516 and substrate layer 510.

Figure 6B:
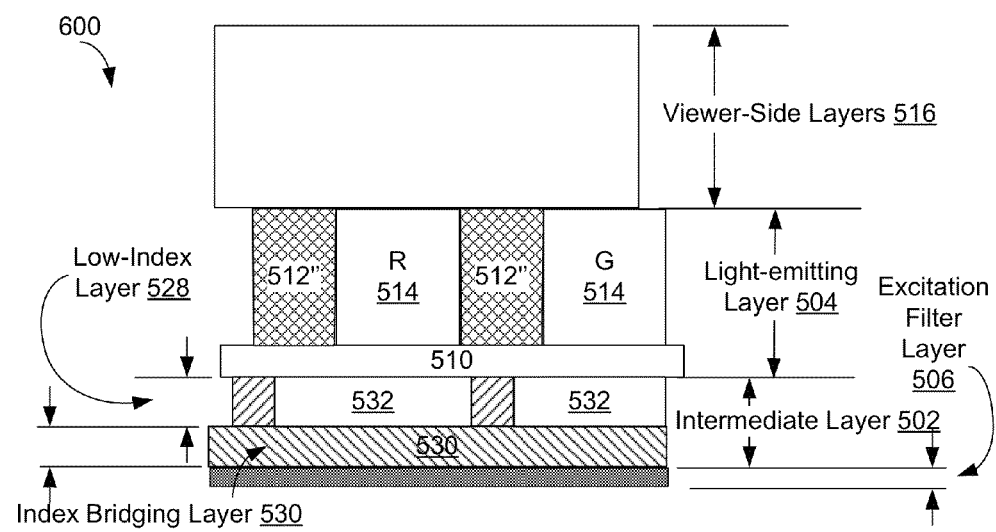

In some embodiments, as shown in FIG. 6B, the stripe dividers (e.g., stripe dividers 512") that separate adjacent fluorescent stripes 514 have straight sidewalls rather than angled sidewalls, and each stripe divider 512" is in contact with two adjacent fluorescent stripes 514 from top to bottom. In some embodiments, as shown in FIG. 6B, no low-index gap exists between each stripe divider 512" and its adjacent fluorescent stripes 514. In addition, as shown in FIG. 6B, no low-index gap exists between viewer-side layer 516 and fluorescent stripes 514 in the fluorescent layer.

Figure 6C:
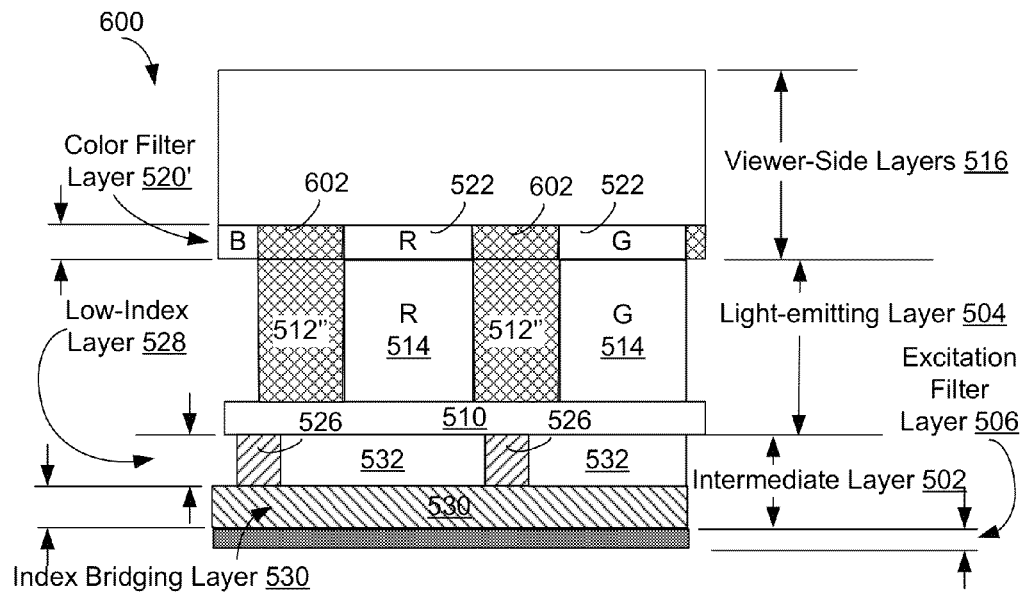

In some embodiments, as shown in FIG. 6C, stripe dividers 512" have straight sidewalls rather than angled sidewalls. In some embodiments, viewer side layers 516 includes color filter layer 520', and color filter layer 520' is in contact with fluorescent stripes 514 and stripe dividers 512" with no low-index gap in between. In some embodiments, the fluorescent layer and the color filter layer each include their own sets of stripe dividers. In some embodiments, the fluorescent layer and the color filter layer share the same set of stripe dividers that extend through both the fluorescent layer and the color filter layer.

Figure 6D:
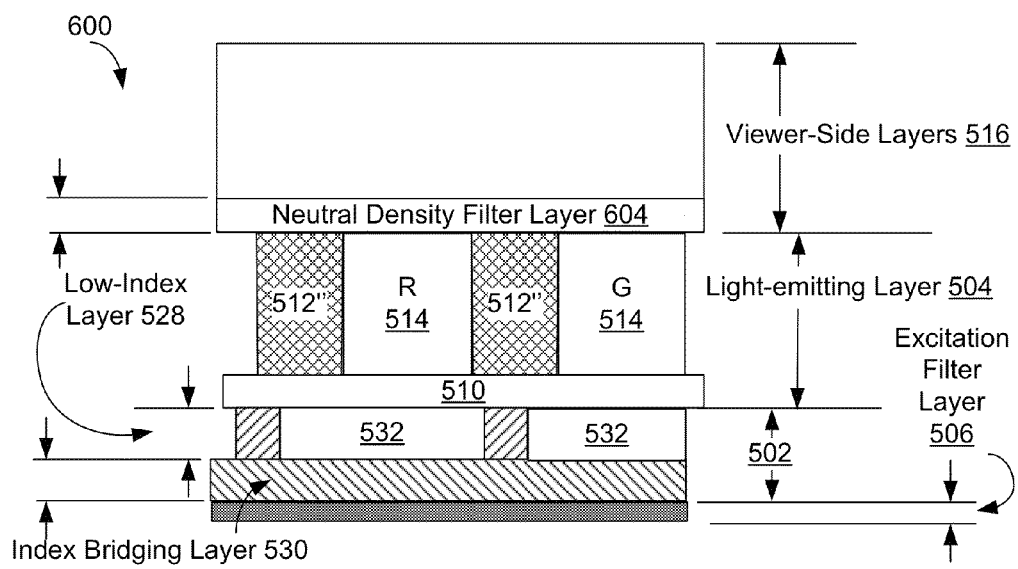

In some embodiments, as shown in FIG. 6D, the color filter layer is replaced by neutral density filter layer 604 and placed adjacent light emitting layer 504 on the viewer side. Neutral density filter layer 604 serves to provide contrast enhancement functions and reduces reflection of ambient light that has entered the screen from the viewer side.

Figure 6E:
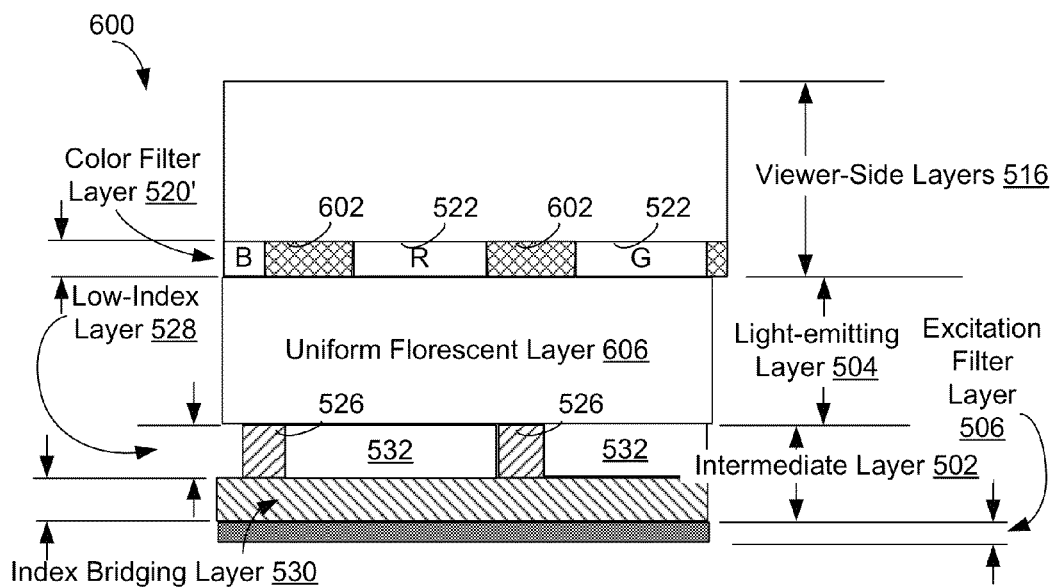

In some embodiments, as shown in FIG. 6E, the fluorescent layer containing colored fluorescent stripes and stripe dividers can be replaced by uniform fluorescent layer 606 that emits broad spectrum white light under irradiation of the excitation light beam. In such embodiments, viewer-side layers 516 includes color filter layer 520'. Color filter layer 520' includes color filter elements 522 that define the boundaries of the colored sub-pixels. Color filter layer 520' also include a stripe divider 602 between each pair of adjacent color filter elements 522.

Figure 6F:
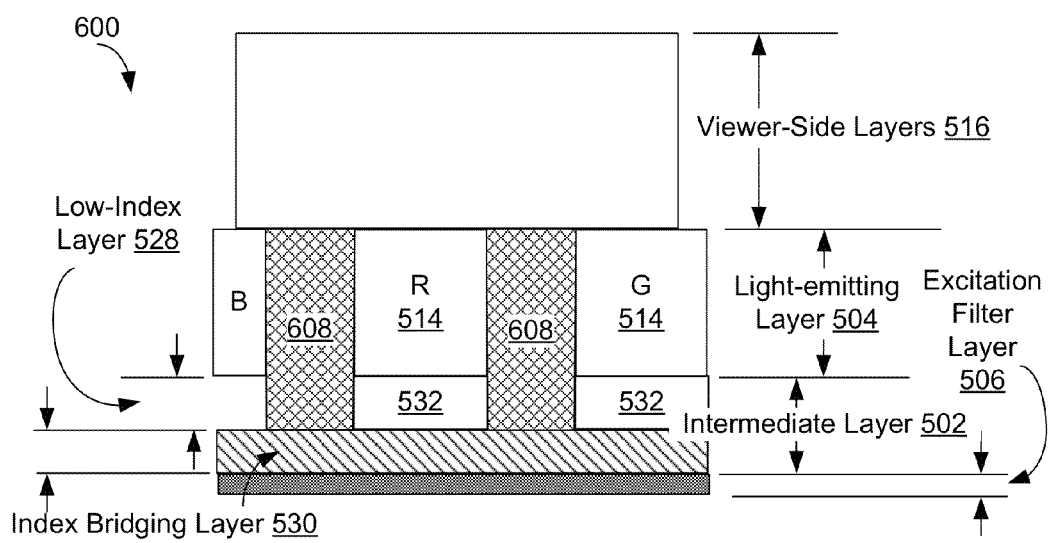

In some embodiments, as shown in FIG. 6F, there is no low-index gap between viewer-side layers 516 and fluorescent stripes 514. In some embodiments, as shown in FIG. 6F, fluorescent stripes 514 in the fluorescent layer is attached to the viewer-side layers without any supporting substrate (e.g., substrate 510) on the excitation side. As shown in FIG. 6F, the lower surfaces (excitation-side-facing surfaces) of fluorescent stripes 514 are in contact with low-index layer 528 (including first regions 532 of intermediate layer 502), and are separated from excitation filter layer 506 by index-bridging layer 530 (the second region of intermediate layer 502). In some embodiments, as shown in FIG. 6F, the stand-off elements (e.g., stand-off elements 608) that separate the light-emitting layer 504 (including only the fluorescent layer and no excitation-side supporting substrate) from excitation filter layer 506 extend through the first regions 532 of intermediate layer 502. As shown in FIG. 6F, stand-off elements 608 each have one end stand on a separate solid index-bridging layer 530 (e.g., an index bridging layer made of PET or glass), and have the other end extend into light-emitting layer 504. In some embodiments, index bridging layer 530 is a PSA layer holding the stripe dividers 608 to the excitation filter layer 506. In some embodiments, as shown in FIG. 6F, stand-off elements 608 also serve as stripe dividers that each separate a pair of adjacent fluorescent stripes 514 from each other. In some embodiments, stand-off elements 608 are made of materials that are suitable to serve as stripe dividers, such as materials that absorb visible light, or are reflective to visible and excitation light. In some embodiments, stand-off elements that serve as stripe dividers can further extend into viewer-side layers 516, e.g., into a color filter layer adjacent to the fluorescent layer.

Figure 6G:
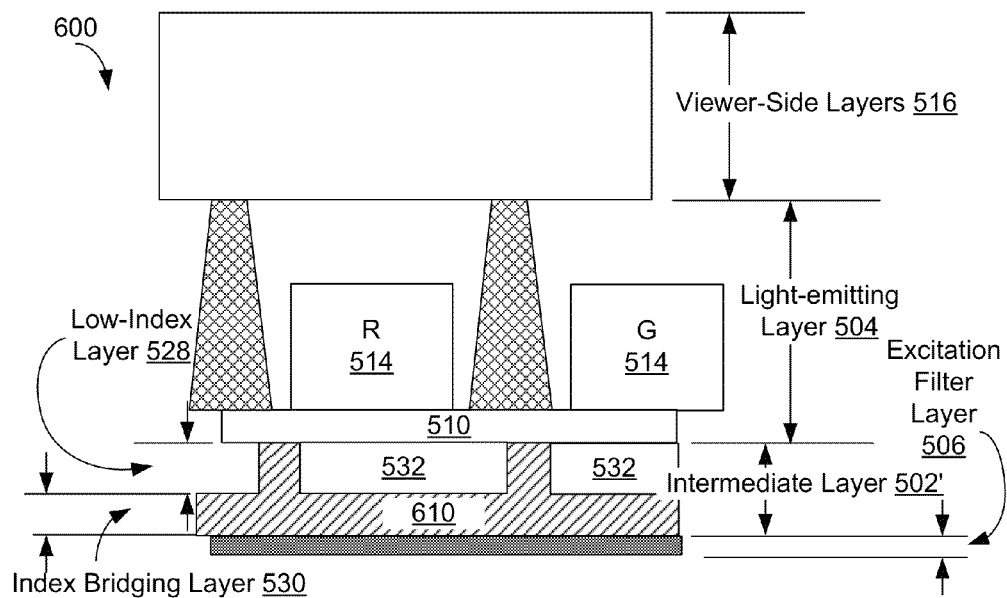

In some embodiments, as shown in FIG. 6G, the intermediate layer (e.g., intermediate layer 502') between excitation filter layer 506 and light-emitting layer 504 includes a unitary structure (e.g., unitary structure 610) made of a single material (e.g., a resin or glass). Unitary structure 610 includes a planar portion that serves as the index-bridging region of intermediate layer 502'. The planar bottom surface of the planar portion is in contact with (e.g., laminated through a thin adhesive layer on) excitation filter layer 506. Unitary structure 610 further includes a ridged upper portion above the planar portion. The ridged upper portion serves to separate the planar portion from light-emitting layer 504. In some embodiments, the top surfaces of the ridged portions are in contact with the bottom surface of the immediately adjacent viewer-side layer. In some embodiments, the ridged upper portion includes a plurality of linear ridges that create recesses 532 in the ridged top surface of unitary structure 610. Recesses 532 serve as first regions of intermediate layer 502' that have a lower refractive index than the planar portion (i.e., the second regions of intermediate layer 502') of unitary structure 610. Recesses 532 are optionally filled with air or another low-index material. In some embodiments, the ridged upper portion includes a plurality of pillars. The pillars are distributed within a continuous low-index region 532 between the planar portion and light-emitting layer 504 that is created by the pillars.

Figure 6H:
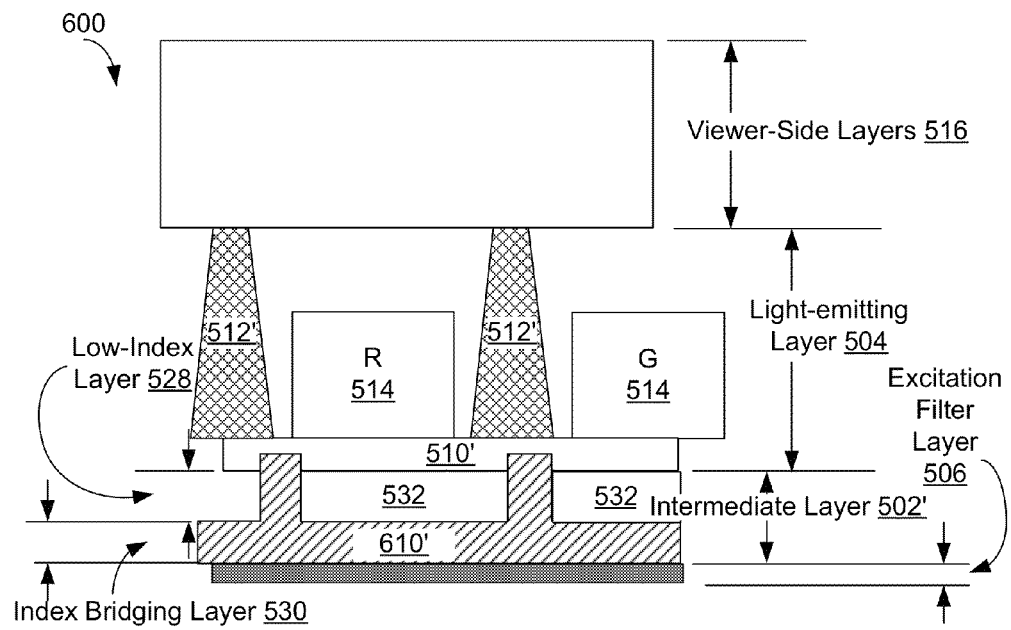

In some embodiments, unitary structure 610 shown in FIG. 6G is modified such that the ridged portion of unitary structure 610 extends through the low-index region of intermediate layer 502' and into light-emitting layer 504. As shown in FIG. 6H, unitary structure 610' has a ridged upper portion that includes ridges extending partially into substrate 510', where substrate 510' is the excitation-side supporting substrate for the fluorescent layer in light-emitting layer 504.

Figure 6I:
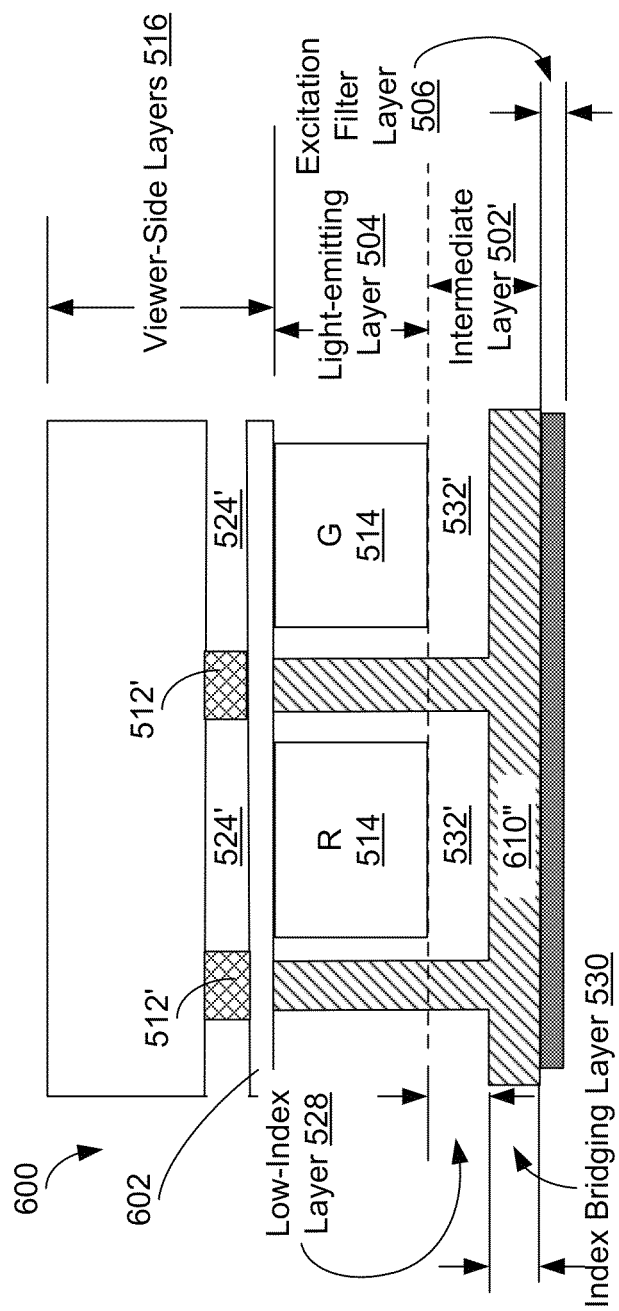

In some embodiments, the unitary structure 610 shown in FIG. 6G is further modified such that the ridged portion of the unitary structure 610 extends through the low-index region of the intermediate layer and into the light-emitting layer 504. As shown in FIG. 6I, in some embodiments, the extended ridges (e.g., the "ribs") on the top surface of the unitary structure 610" serve as stripe dividers (e.g., stripe dividers 512) separating each pair of adjacent colored fluorescent elements 514 in the light-emitting layer 504. In some embodiments, the fluorescent elements 514 are attached to the undersurface of a support layer 602 (i.e., a particular viewer-side layer that is immediately adjacent to the light-emitting layer 504). The extended ridges on the top surface of the unitary structure 610" serves to separate the viewer-side layers 516 (including the support layer 602) and the attached fluorescent elements 514 from the planar portion of the unitary structure 610", thereby creating a plurality of low-index regions 532'. The plurality of low-index regions 532' serves as the low-index layer 528 of the intermediate layer 502'. In some embodiments, the extended ridges of the unitary structure 610" are in contact with the sides of the fluorescent elements 514. In some embodiments, the extended ridges of the unitary structure 610" are not in contact with the sides of the fluorescent elements 514. In some embodiments, when making the display screen structure shown in FIG. 6I, the lower portion of the screen (containing the unitary structure 610" and the excitation filter layer 506) and the upper portion of the screen (containing the fluorescent elements 514, the support layer 602, and optionally additional viewer-side layers) are assembled separately. The upper portion and the lower portion are then brought together into alignment and adhered to each other. In some embodiments, above the support layer 602, a number of low-index gaps 524' are created between the support layer 602 and the other view-side layers by a plurality of stand-off elements 512'. The low-index gaps 524' reduce the reflection of the visible light emitted by fluorescent elements 514 back toward the excitation side. In some embodiments, the support layer 602 is made as thin as practicable.

FIGS. 6A-6I are merely illustrative some of the variations that can be made to the screens. Particular combinations of screen elements shown in FIGS. 6A-6I do not imply that those were the only combinations possible. Other combinations of variations are possible and are apparent from the descriptions contained in this specification to a person skilled in the art.

Figure 7:
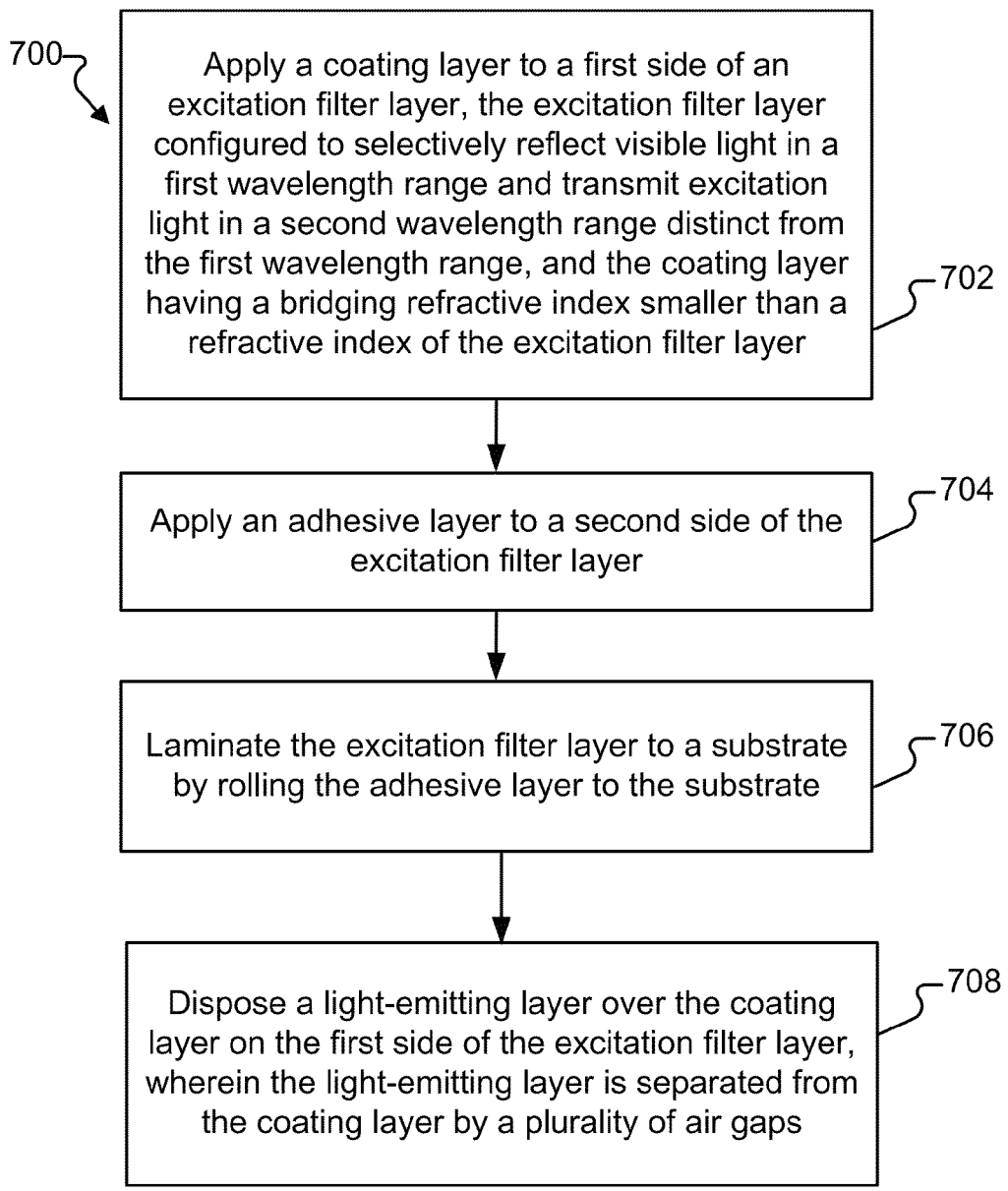
FIG. 7 is a flow diagram of an example process for making a display screen in according to some embodiments.

FIG. 7 illustrates an example process 700 for making a display screen comprising an index-bridging layer (e.g., a solid layer separate from the stand-off elements separating the index bridging layer from the light-emitting layer). In the process 700, a coating layer is applied (702) to a first side of an excitation filter layer. The excitation filter layer is configured to selectively reflect visible light in a first wavelength range (e.g., the visible range of the optical spectrum, or the discrete ranges of the optical spectrum for the colored light emitted by the colored fluorescent stripes) and transmit excitation light in a second wavelength range distinct from the first wavelength range. The coating layer has a bridging refractive index smaller than the refractive index of the excitation filter layer. In some embodiments, the excitation filter layer is a large sheet of coextruded multi-layer film. In some embodiments, the liquid coating material (e.g., a solid coating material dissolved in a solvent) is sprayed onto one side of the coextruded multi-layer film, and then cured (e.g., through UV exposure) on the coextruded multi-layer film. After the cure, a solid hard coat layer is formed on the co-extruded multi-layer film.

In some embodiments, an adhesive layer (e.g., a pressure sensitive adhesive layer) is applied (704) to the exposed side of the excitation filter layer, e.g., after the coating layer has been applied to the excitation filter layer. For example, in some embodiments, a pressure sensitive adhesive layer (PSA) is applied to the side of the coextruded multi-layer film that has not been coated with the solid hard coat layer, while the coextruded multi-layer is high-speed rolled without applying sufficient pressure to activate the pressure sensitive adhesive. Because the pressure sensitive adhesive applied onto the coextruded multi-layer film has not been activated, the roll of coextruded multi-layer film can still be unrolled without damage to the film or the adhesive layer.

In some embodiments, the excitation filter layer is laminated (706) to a substrate by rolling the adhesive layer to the substrate, e.g., after applying the adhesive layer to the excitation filter layer. For example, in some embodiments, the roll of coextruded multi-layer film is slowly unrolled with the PSA coated side facing the surface of a substrate (e.g., an excitation-side layer such as a servo layer made of glass). In some embodiments, while the roll of coextruded multi-layer film is slowly unrolled, pressure is applied to activate the PSA layer, such that the coextruded multi-layer film is laminated onto the substrate by the activated PSA.

In some embodiments, a light-emitting layer is disposed (708) over the coating layer on the first side of the excitation filter layer, e.g., after the laminating, wherein the light-emitting layer is separated from the coating layer by a plurality of low-index gaps. For example, in some embodiments, a plurality of glue lines are applied to a substrate in the light-emitting layer, and the first side of the excitation filter layer is attached to the light-emitting layer by the glue lines.

In some embodiments, the process 700 is modified when the coextruded multi-layer film is already coated with a PSA layer on one side and a release agent on the other side. For example, some providers of the coextruded multi-layer film provide the film with the PSA coating that cannot be removed easily. In such situations, a solid index-bridging layer is made from a layer of PET or glass. The PSA coated multi-layer film is slowly rolled onto the layer of PET or glass with the PSA side facing the layer of PET or glass. Then, sufficient pressure can be applied to activate the PSA, such that the coextruded multi-layer film is laminated onto the layer of PET or glass by the PSA. Then, the layer of glass or PET together with the coextruded multi-layer film can be attached to the light-emitting layer using a plurality of glue lines applied on the bottom surface of the light-emitting layer. Other methods of screens containing a intermediate layer between the light-emitting layer and the excitation filter layer are possible.

While this document contains many specifics, these should not be construed as limitations on the scope of an invention or of what may be claimed, but rather as descriptions of features specific to particular embodiments of the invention. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or a variation of a subcombination.

Only a few implementations are disclosed. However, variations and enhancements of the described implementations and other implementations can be made based on what is described and illustrated in this document.

What is claimed is:
1. A display screen, comprising:
 a light-emitting layer configured to emit visible light in a first wavelength range under irradiation of excitation light in a second wavelength range distinct from the first wavelength range, the light-emitting layer having a first side facing a viewer side of the display screen, and a second side facing an excitation side of the display screen;

an excitation filter layer disposed on the excitation side of display screen relative to the light-emitting layer, and configured to selectively reflect the visible light in the first wavelength range and transmit the excitation light in the second wavelength range; and an intermediate layer disposed between and adjacent to the light-emitting layer and the excitation filter layer, wherein the intermediate layer comprises one or more first regions in contact with the light-emitting layer, and a second region separating the one or more first regions from the excitation filter layer, and wherein the second region has a bridging refractive index between a first refractive index of the one or more first regions and a second refractive index of the excitation filter layer.

2. The display screen of claim 1, wherein:
the second region of the intermediate layer is a layer of glass; and
the one or more first regions are one or more air gaps created by a plurality of stand-off elements separating the layer of glass from the light-emitting layer.

3. The display screen of claim 1, wherein:
the second region of the intermediate layer is a layer of PET; and
the one or more first regions are one or more air gaps created by a plurality of stand-off elements separating the layer of PET from the light-emitting layer.

4. The display screen of claim 1, wherein:
the display screen comprises a plurality of standoff elements separating the second region of the intermediate layer from the light-emitting layer;
the plurality of stand-off elements are a plurality of supporting ridges; and
the plurality of supporting ridges create a plurality of air gaps in a low-index layer separating the second region from the light-emitting layer.

5. The display screen of claim 1, wherein:
the display screen comprises a plurality of standoff elements separating the second region of the intermediate layer from the light-emitting layer;
the light-emitting layer comprises a plurality of colored fluorescent stripes, and
the plurality of stand-off elements are stripe dividers each separating an adjacent pair of colored fluorescent stripes in the light-emitting layer.

6. The display screen of claim 1, wherein:
the display screen comprises a plurality of standoff elements separating the second region of the intermediate layer from the light-emitting layer;
the plurality of stand-off elements are a plurality of supporting pillars; and
the plurality of supporting pillars create an air gap separating the second region from the light-emitting layer.

7. The display screen of claim 1, wherein:
the display screen comprises a plurality of standoff elements separating the second region of the intermediate layer from the light-emitting layer; and
the plurality of stand-off elements each extend through the intermediate layer and at least part of the light-emitting layer.

8. The display screen of claim 1, wherein:
the display screen comprises a plurality of standoff elements separating the second region of the intermediate layer from the light-emitting layer; and
the plurality of stand-off elements each extend between the light-emitting layer and the excitation filter layer.

9. The display screen of claim 1, wherein:
the intermediate layer comprises a unitary structure having the bridging refractive index, the unitary structure having a flat first surface in contact with the excitation filter layer, and a ridged second surface in contact with the light-emitting layer, wherein one or more recessed areas on the ridged second surface of the unitary structure form the one or more first regions in the intermediate layer.

10. The display screen of claim 1, wherein:
the excitation filter layer is a coextruded multi-layer film stack configured to create a transmission resonance for the excitation light in the second wavelength range.

11. The display screen of claim 1, wherein:
the excitation filter layer is configured to create a transmission resonance for ultra-violet light of 405-415 nm wavelength.

12. The display screen of claim 1, wherein:
the second region in the intermediate layer reduces intensity variations in the excitation light transmitted through the excitation filter layer to the light-emitting layer that have resulted from manufacturing variability in the excitation filter layer.

13. The display screen of claim 1, wherein:
the excitation light is ultra-violet light of 405-415 nm wavelength.

14. The display screen of claim 1, wherein:
the first refractive index is approximately 1.0, the second refractive index is approximately 1.67, and the bridging refractive index is approximately 1.43.

15. The display screen of claim 1, wherein:
the second region in the intermediate layer has a thickness of approximately 5 microns and the bridging refractive index is approximately 1.4-1.5.

16. The display screen of claim 1, wherein:
the light-emitting layer is a fluorescent layer having a thickness of approximately ten times a thickness of the second region in the intermediate layer.

17. The display screen of claim 1, wherein:
the one or more first regions in the intermediate layer each have a thickness of approximately 20 microns and the second region in the intermediate layer has a thickness of approximately 5 microns.

18. The display screen of claim 1, wherein:
the display screen further comprises a color filter layer on the viewer side of the display screen relative to the light-emitting layer, and the color filter layer comprises a periodic array of colored filter elements configured to transmit different colored light according to a predetermined sub-pixel pattern.

19. The display screen of claim 1, wherein:
the light-emitting layer is a fluorescent layer emitting broad-spectrum visible light under irradiation of the excitation light.

20. The display screen of claim 1, wherein:
the light-emitting layer is a fluorescent layer comprising a periodic array of colored fluorescent elements configured to emit different colored light according to a predetermined sub-pixel pattern when irradiated by the excitation light.

21. The display screen of claim 1, further comprising:
one or more viewer-side layers disposed on the viewer side of the display screen relative to the light-emitting layer, the one or more viewer-side layers including one or more of: a UV block layer, a contrast enhancement layer, and an outer protective layer.

22. The display screen of claim 1, further comprising:
an excitation source; and
one or more excitation-side layers disposed on the excitation side the display screen relative to the excitation filter layer, the one or more excitation-side layers including one or more of: a Fresnel layer, a servo layer, a mechanical support layer, and an antireflection coating layer.

23. A process for making a display screen, comprising:
applying a coating layer to a first side of an excitation filter layer, the excitation filter layer configured to selectively reflect visible light in a first wavelength range and transmit excitation light in a second wavelength range distinct from the first wavelength range, wherein the coating layer has a bridging refractive index smaller than a refractive index of the excitation filter layer;
applying an adhesive layer to a second side of the excitation filter layer;
laminating the excitation filter layer to a substrate by rolling the adhesive layer to the substrate; and
disposing a light-emitting layer over the coating layer on the first side of the excitation filter layer, wherein the light-emitting layer is separated from the coating layer by a plurality of air gaps.

* * * * *